United States Patent
Kim et al.

(10) Patent No.: US 10,575,278 B2
(45) Date of Patent: Feb. 25, 2020

(54) METHOD FOR CONTROLLING IDLE-MODE SIGNALING REDUCTION OF TERMINAL IN WIRELESS COMMUNICATION SYSTEM AND APPARATUS FOR THE SAME

(71) Applicant: LG ELECTRONICS INC., Seoul (KR)

(72) Inventors: Jaehyun Kim, Seoul (KR); Taehun Kim, Seoul (KR); Sangmin Park, Seoul (KR); Jinsook Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/770,425

(22) PCT Filed: Oct. 24, 2016

(86) PCT No.: PCT/KR2016/011985
§ 371 (c)(1),
(2) Date: Apr. 23, 2018

(87) PCT Pub. No.: WO2017/069598
PCT Pub. Date: Apr. 27, 2017

(65) Prior Publication Data
US 2018/0317200 A1 Nov. 1, 2018

Related U.S. Application Data

(60) Provisional application No. 62/245,283, filed on Oct. 23, 2015, provisional application No. 62/246,562, filed on Oct. 26, 2015.

(51) Int. Cl.
*H04W 68/02* (2009.01)
*H04W 52/02* (2009.01)

(52) U.S. Cl.
CPC ....... *H04W 68/02* (2013.01); *H04W 52/0212* (2013.01)

(58) Field of Classification Search
CPC . H04W 68/02; H04W 52/0209; H04W 76/28; H04W 68/00; H04W 52/0212; H04W 76/20; H04W 76/18
See application file for complete search history.

(56) References Cited

U.S. PATENT DOCUMENTS

| | | | |
|---|---|---|---|
| 2012/0157132 A1* | 6/2012 | Olsson | H04W 68/00 455/458 |
| 2012/0264443 A1 | 10/2012 | Ng et al. | |
| 2014/0101303 A1* | 4/2014 | Gupta | H04W 28/0252 709/224 |

(Continued)

FOREIGN PATENT DOCUMENTS

| | | |
|---|---|---|
| KR | 10-1009137 B1 | 1/2011 |
| KR | 10-2011-0043405 A | 4/2011 |

(Continued)

OTHER PUBLICATIONS

3GPP, Technical Specification Group Services and System Aspects; Study on optimizations to support high latency communications; Stage 2 (Release 13); Jun. 2015, TR 23.709 V13.000 (Jun. 2015). (Year: 2015).*

(Continued)

*Primary Examiner* — Shailendra Kumar
(74) *Attorney, Agent, or Firm* — Birch, Stewart, Kolasch & Birch, LLP

(57) ABSTRACT

It is disclosed a method and apparatus for controlling Idle-mode Signaling Reduction of a user equipment in a wireless communication system. Particularly, a method for controlling paging of a user equipment (UE) in which Idle-mode Signaling Reduction (ISR) is activated performed by a Serving Gateway (S-GW) in a wireless communication system may include transmitting a Downlink Data Notification (DDN) message to both of a first network node and (Continued)

a second network node, when receiving downlink data from a Packet Data Network Gateway (P-GW); and, when receiving a DDN Reject message from either one network node of the first network node and the second network node in response to the DDN message, transmitting a Stop Paging Indication message to a remaining network node.

9 Claims, 19 Drawing Sheets

(56) References Cited

U.S. PATENT DOCUMENTS

| | | | | |
|---|---|---|---|---|
| 2014/0128110 | A1* | 5/2014 | Wang | H04W 64/00 455/458 |
| 2014/0221001 | A1 | 8/2014 | Yang et al. | |
| 2018/0115923 | A1* | 4/2018 | Chandramouli | H04W 88/182 |
| 2018/0242136 | A1* | 8/2018 | Lu | H04W 8/02 |

FOREIGN PATENT DOCUMENTS

| | | |
|---|---|---|
| KR | 10-2013-0019024 A | 2/2013 |
| KR | 10-2014-0143456 A | 12/2014 |
| WO | WO 2014/042482 A2 | 3/2014 |
| WO | WO 2015/105301 A1 | 7/2015 |

OTHER PUBLICATIONS

Qualcomm Incorporated,Solution for Buffering downlink data in S-GW for UEs not immediately reachable, 3GPP SA WG2 Meeting #S2-106, Nov. 17-21, 2014, San Francisco, USA, S2-144170 (Year: 2014).*

3GPP TS 24.008 V13.3.0 (Sep. 2015), Technical Specification, 3rd Generation Partnership Project; Technical Specification Group Core Network and Terminals; Mobile radio interface Layer 3 specification; Core network protocols; Stage 3 (Release 13), 729 pgs.

3GPP, "3rd Generation Partnership Project; Technical Specification Group Core Network and Terminals; Mobile radio interface Layer 3 specification; Core network protocols; Stage 3 (Release 13)," 3GPP TS 24.008, V13.3.0, Sep. 2015, pp. 1-727.

Qualcomm Incorporated, "Solution for Buffering downlink data in S-GW for UEs not immediately reachable," SA WG2 Meeting #S2-106, S2-144170, Nov. 17-21, 2014, San Francisco, USA, pp. 1-4.

* cited by examiner

[FIG. 1]
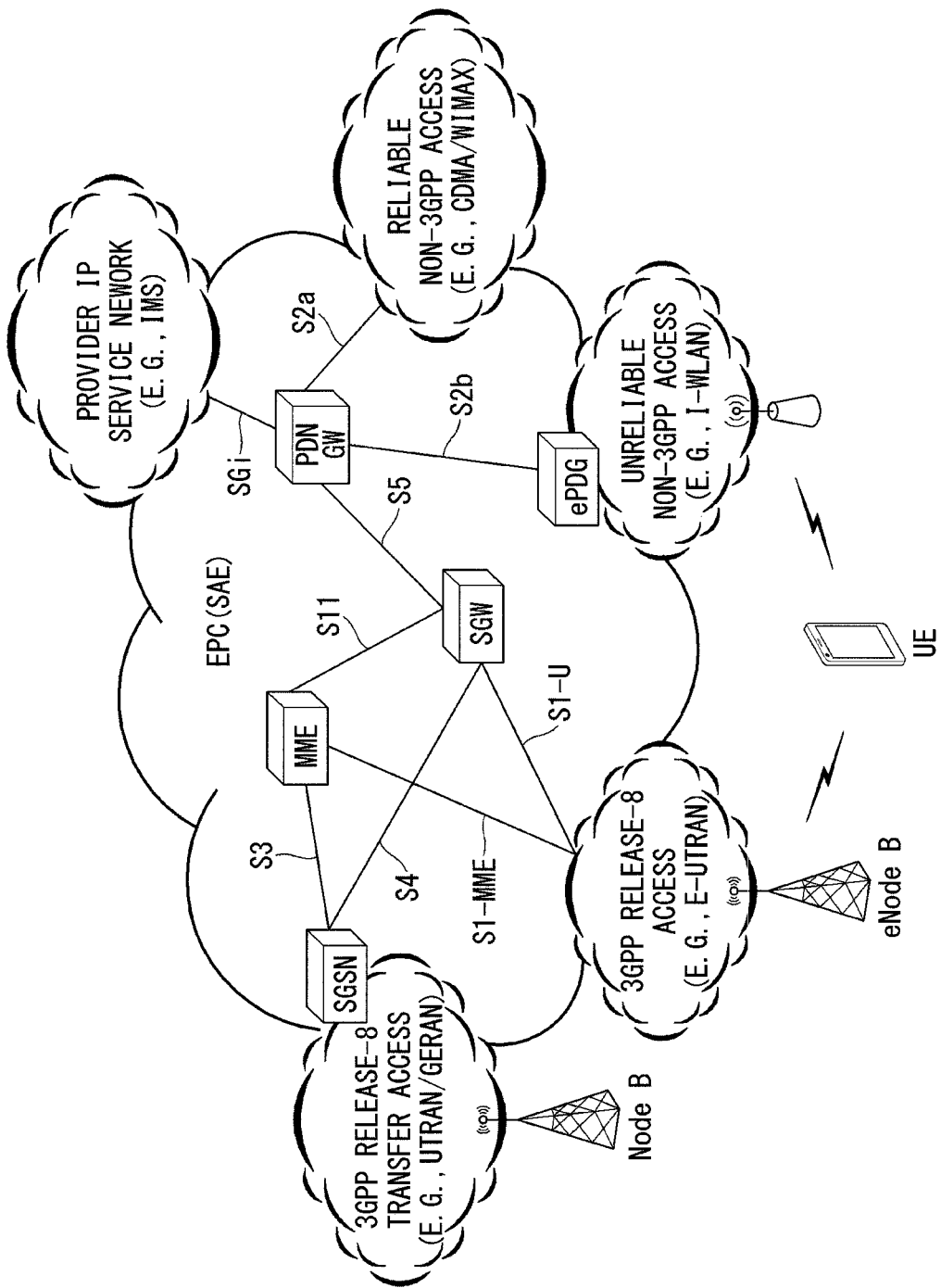

[FIG. 2]
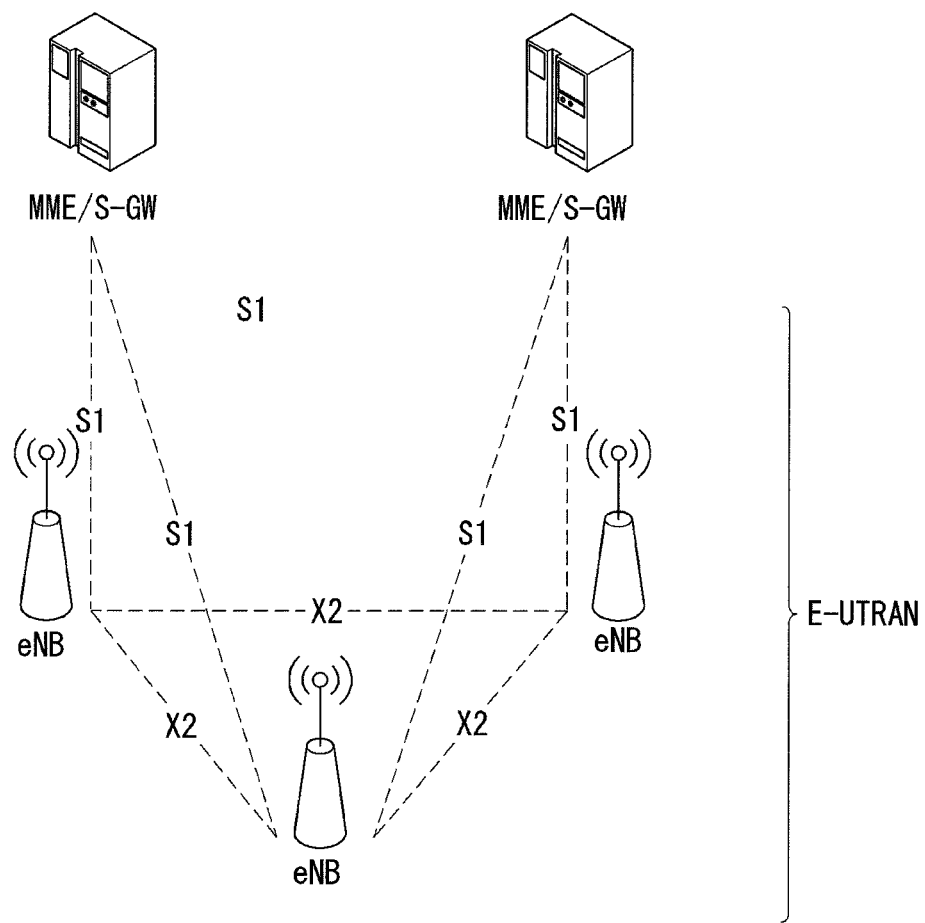

[FIG. 3]
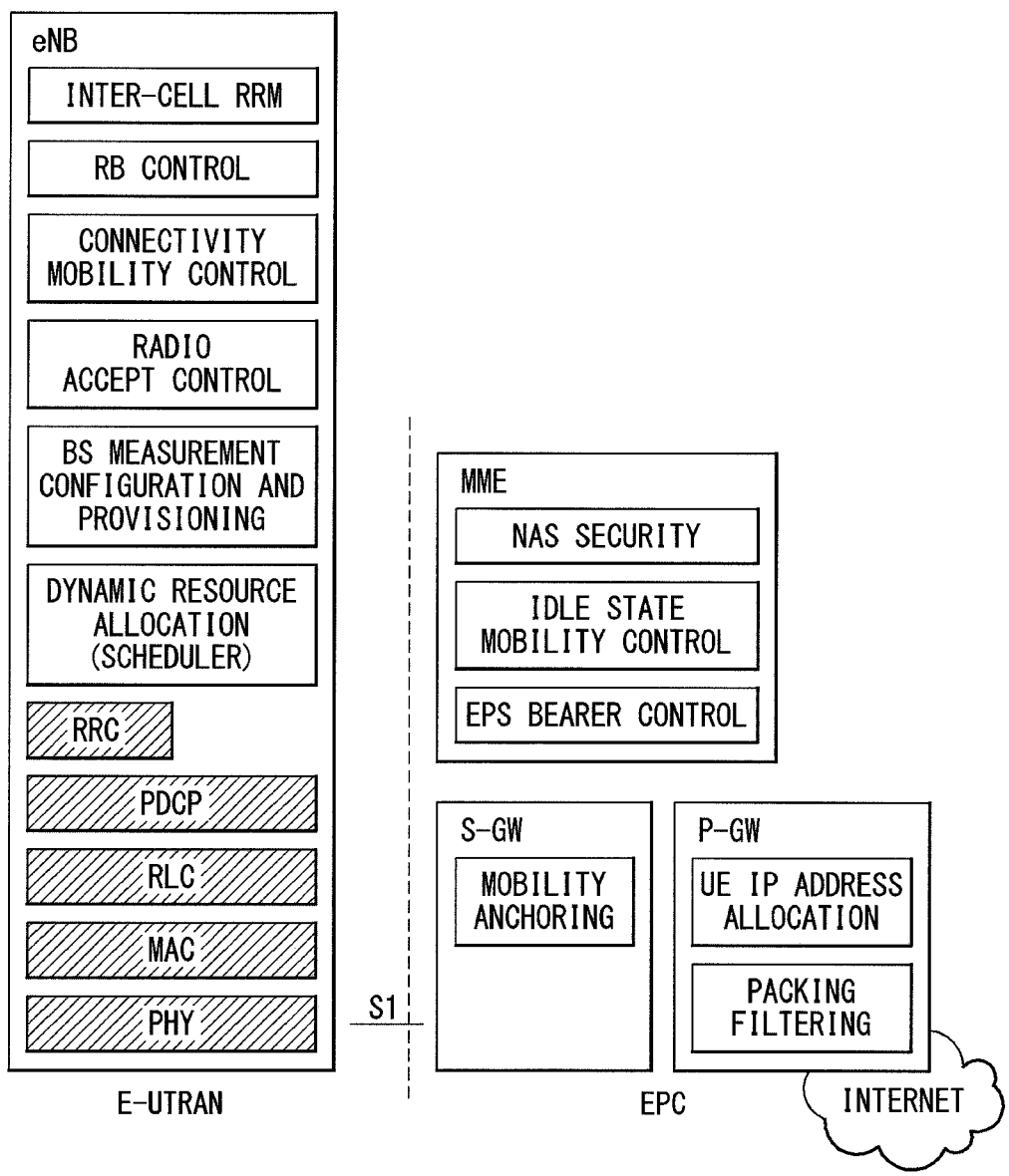

[FIG. 4]
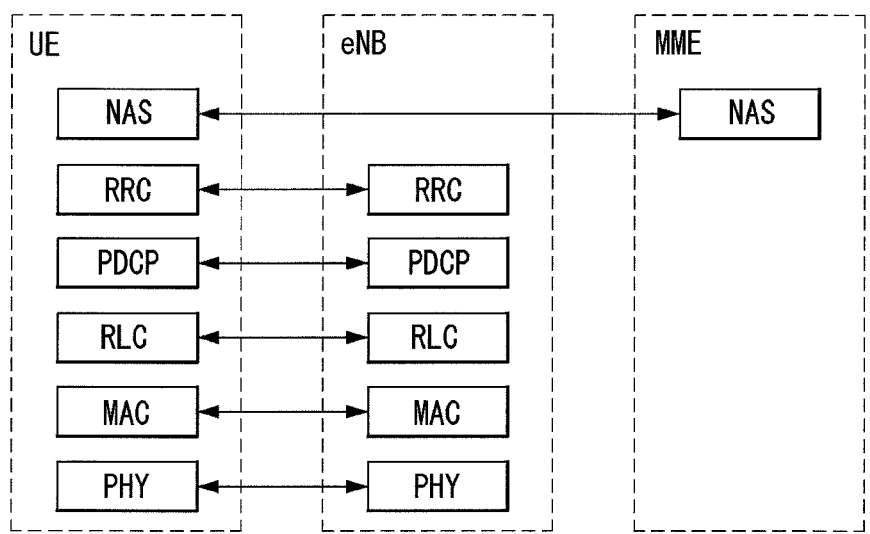
(a) CONTROL PLANE PROTOCOL STACK
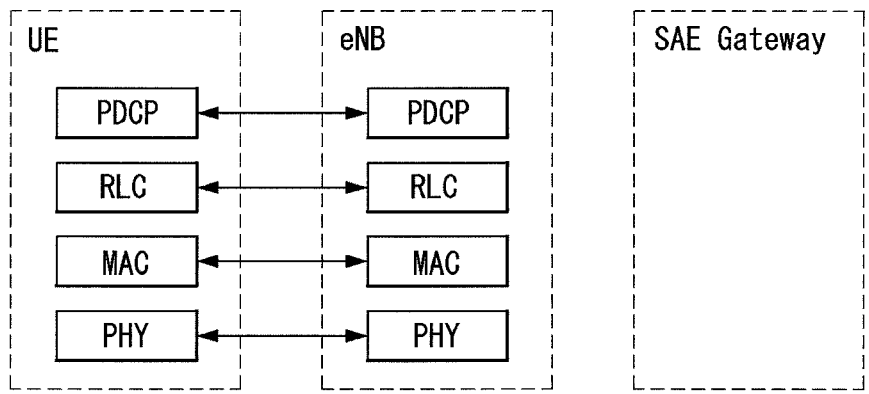
(b) USER PLANE PROTOCOL STACK

[FIG. 5]
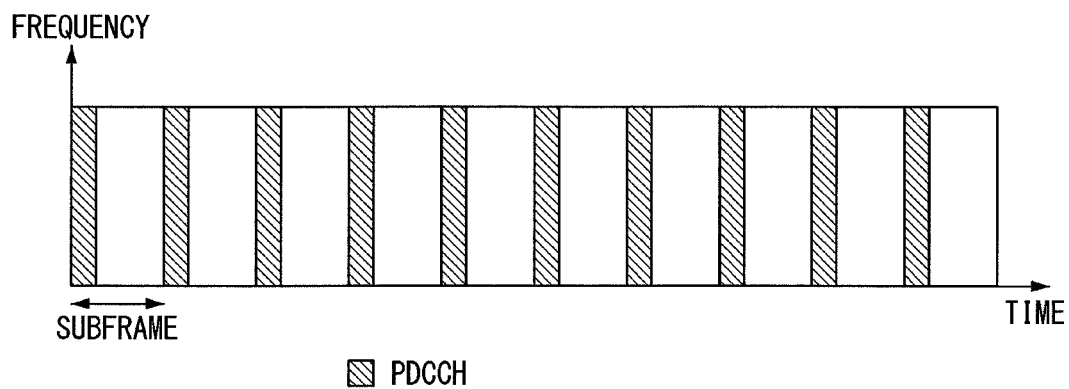
[FIG. 6]
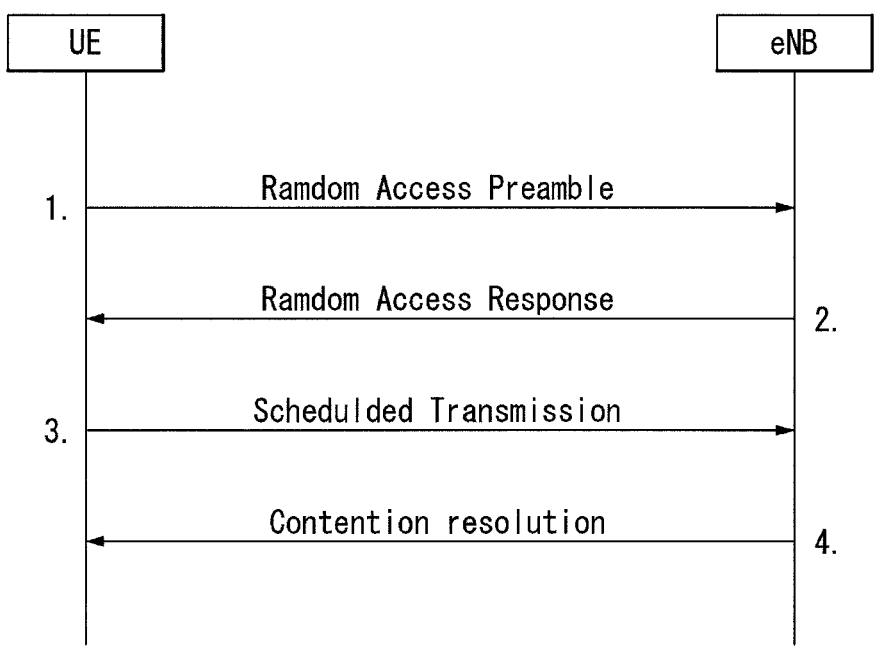

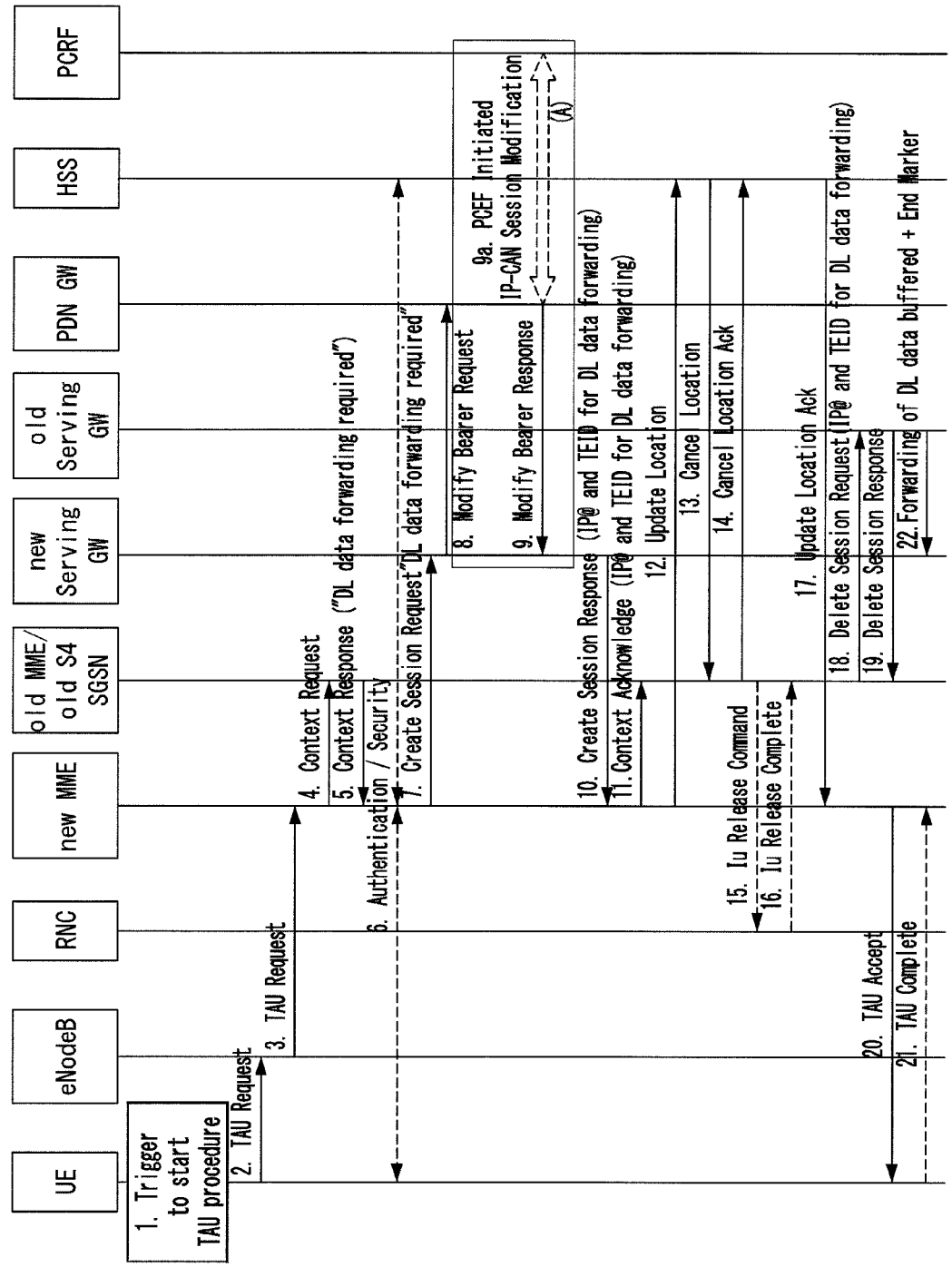
[FIG. 7]

[FIG. 8]
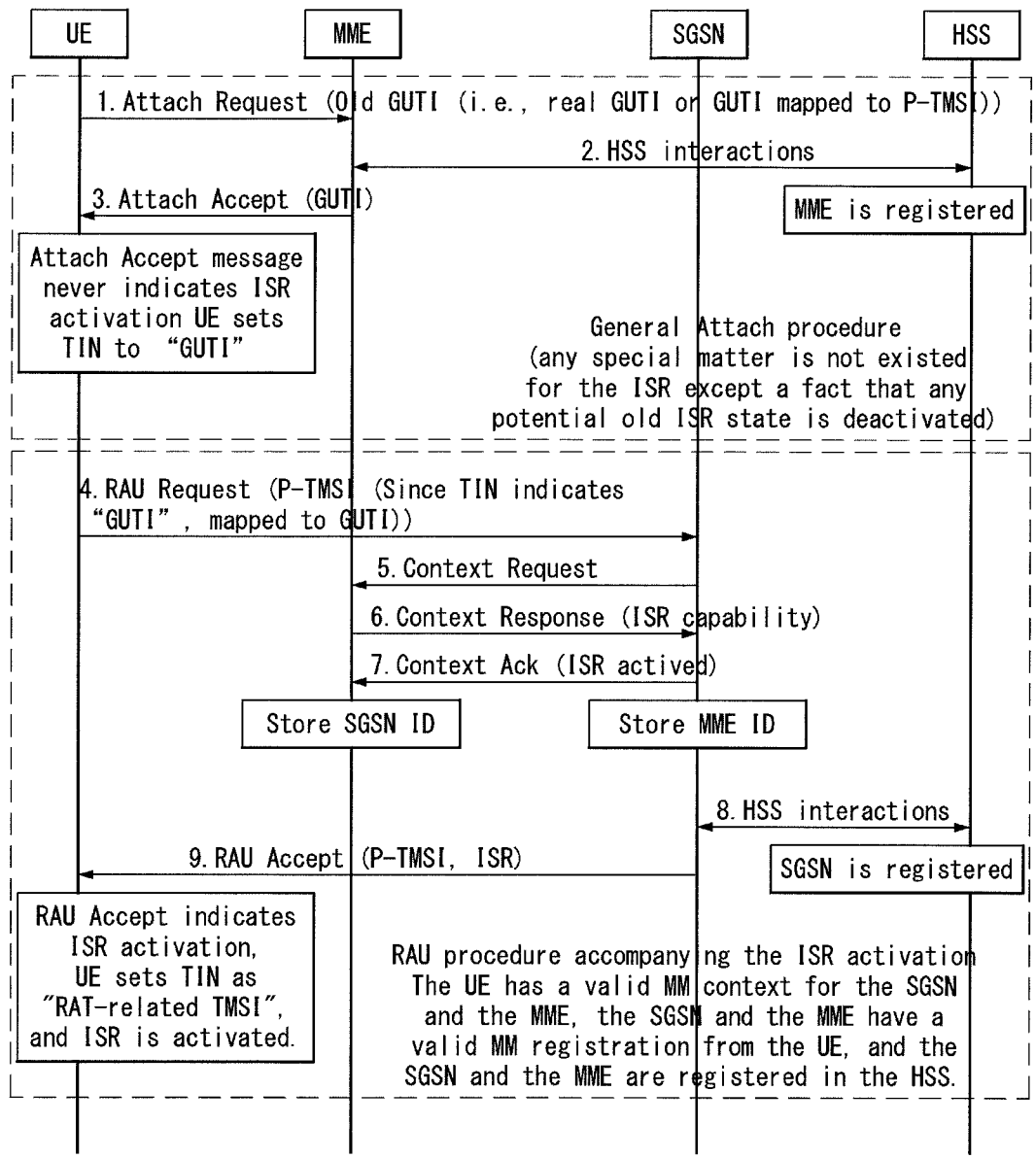

[FIG. 9]
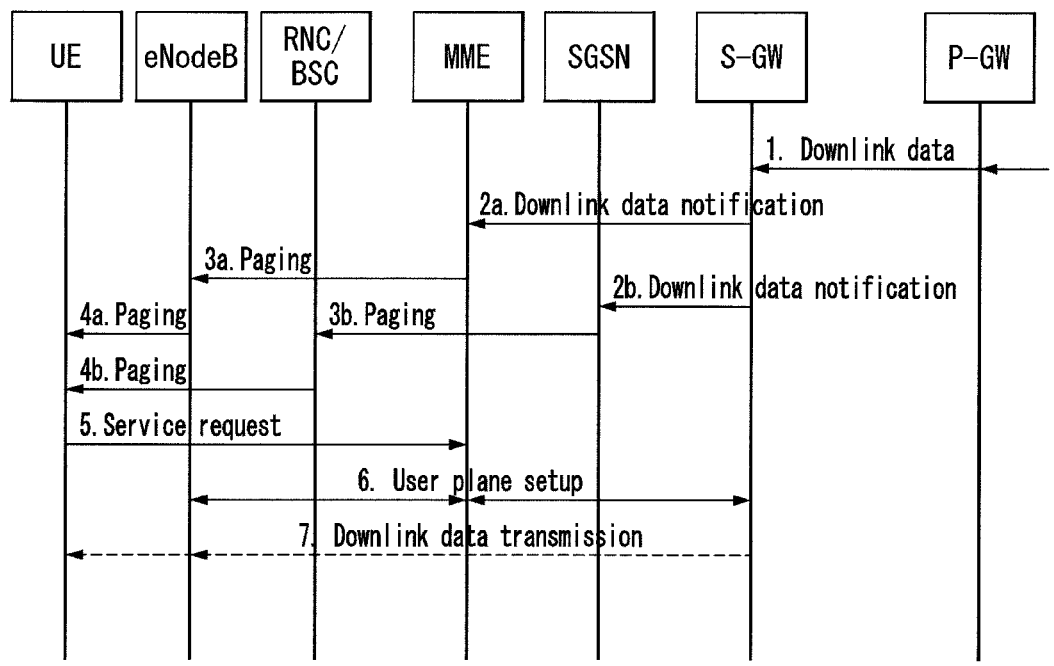

[FIG. 10]
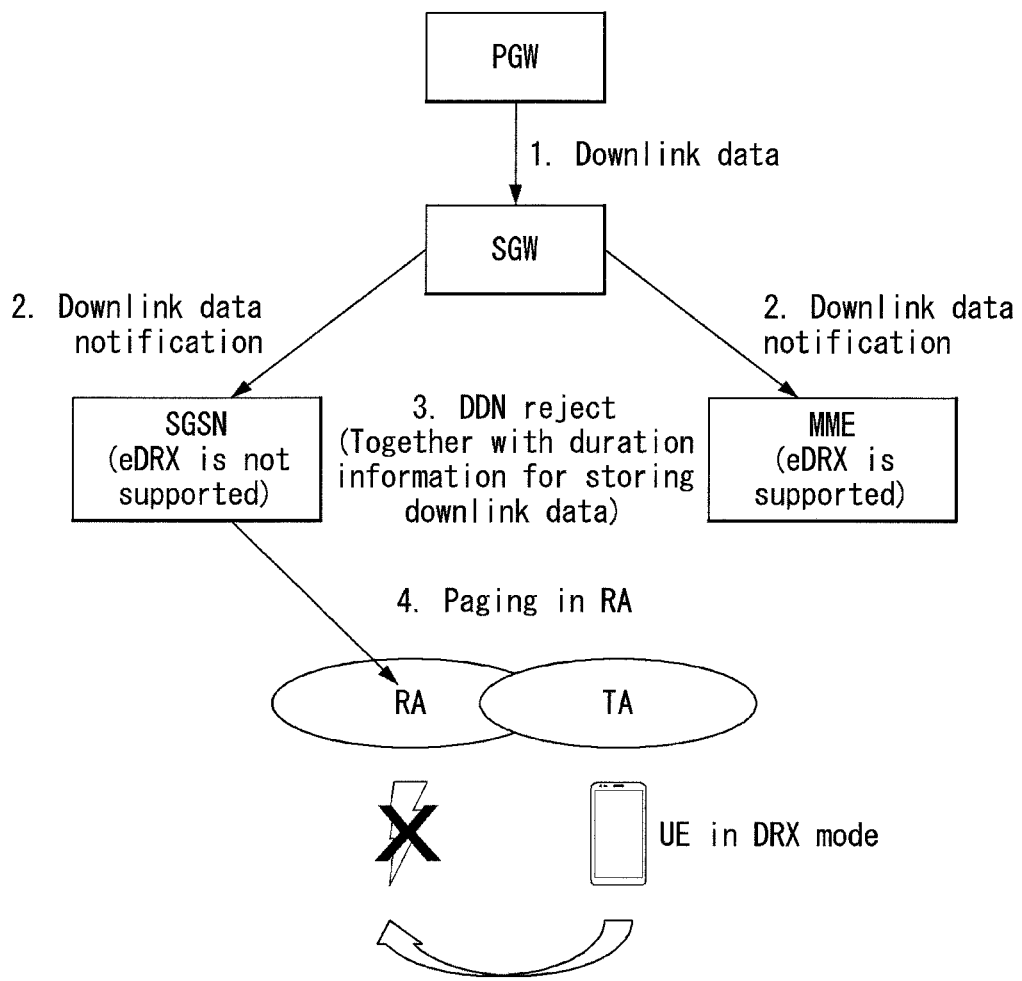

[FIG. 11]
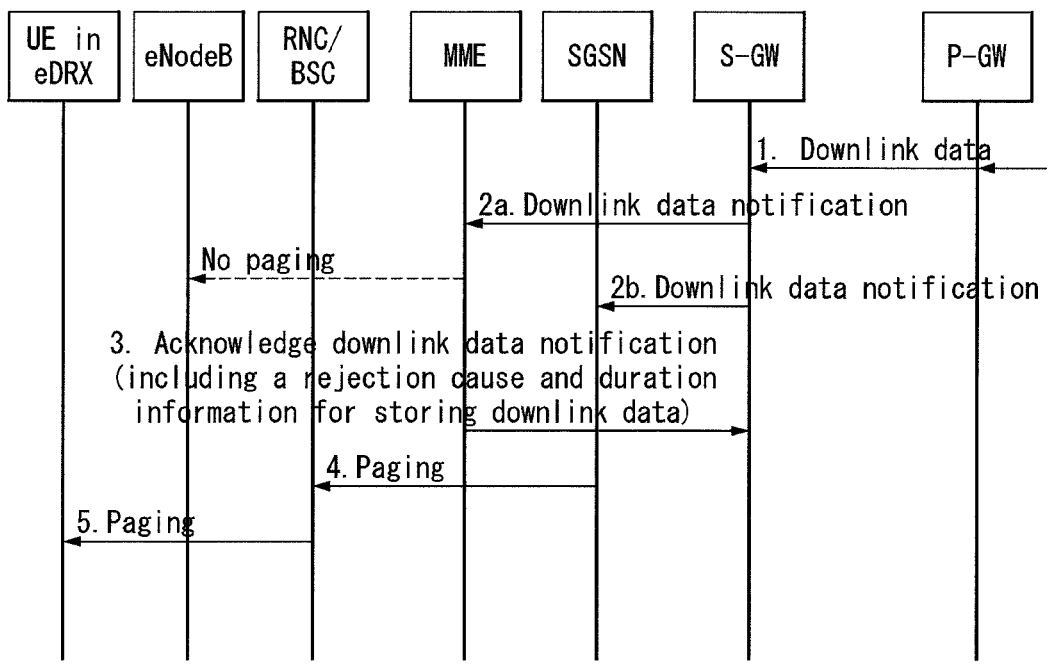

[FIG. 12]
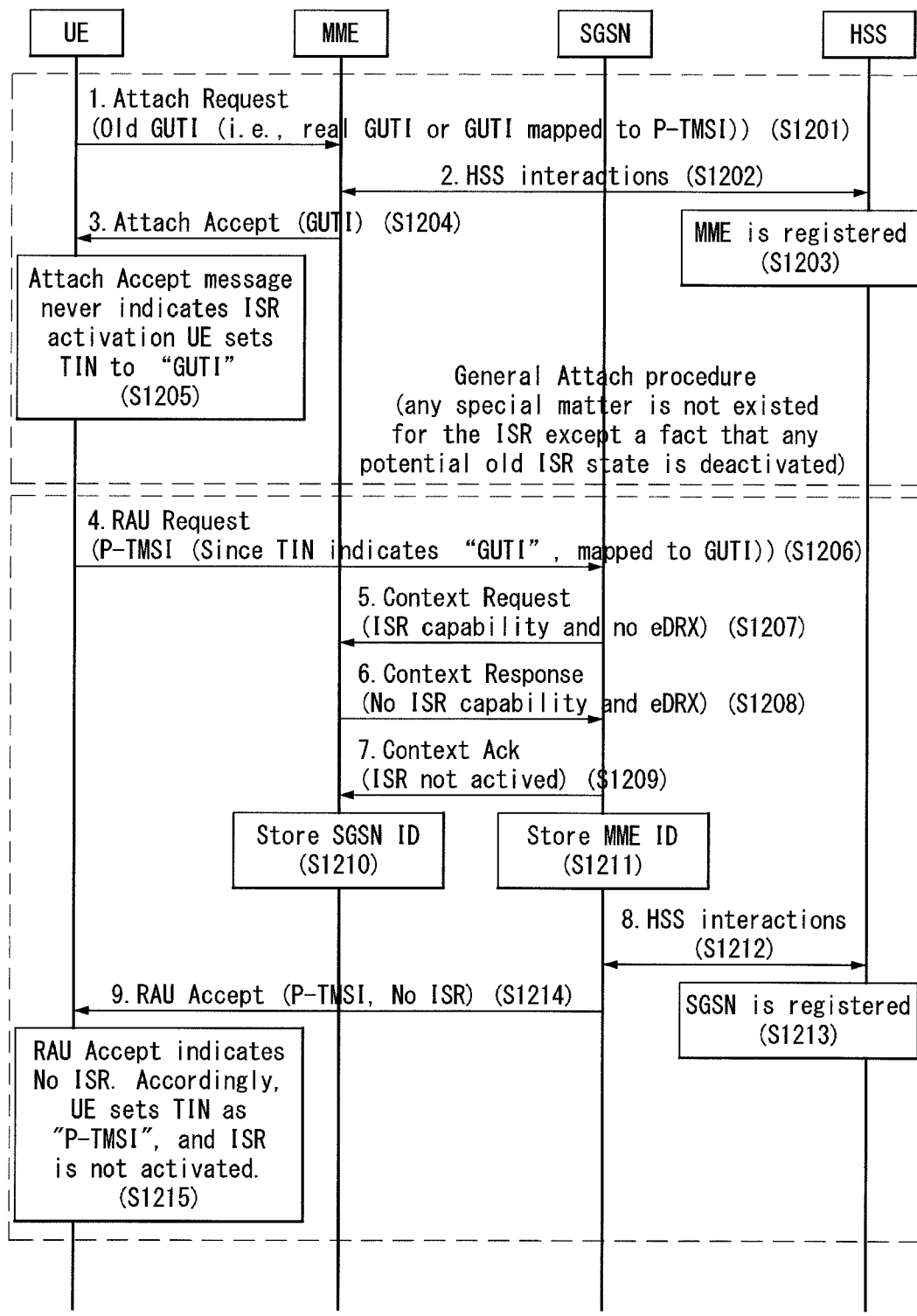

[FIG. 13]
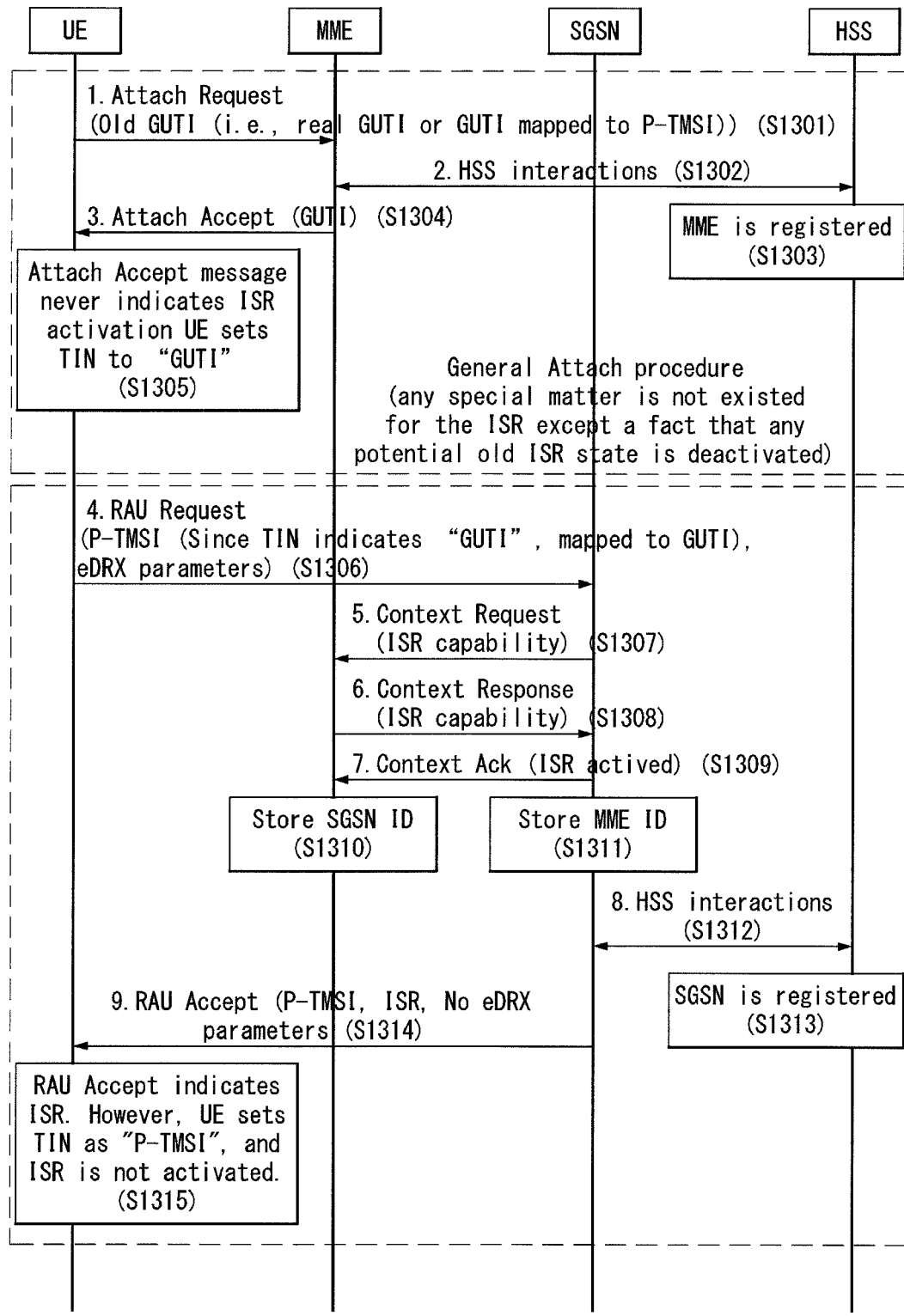

[FIG. 14]
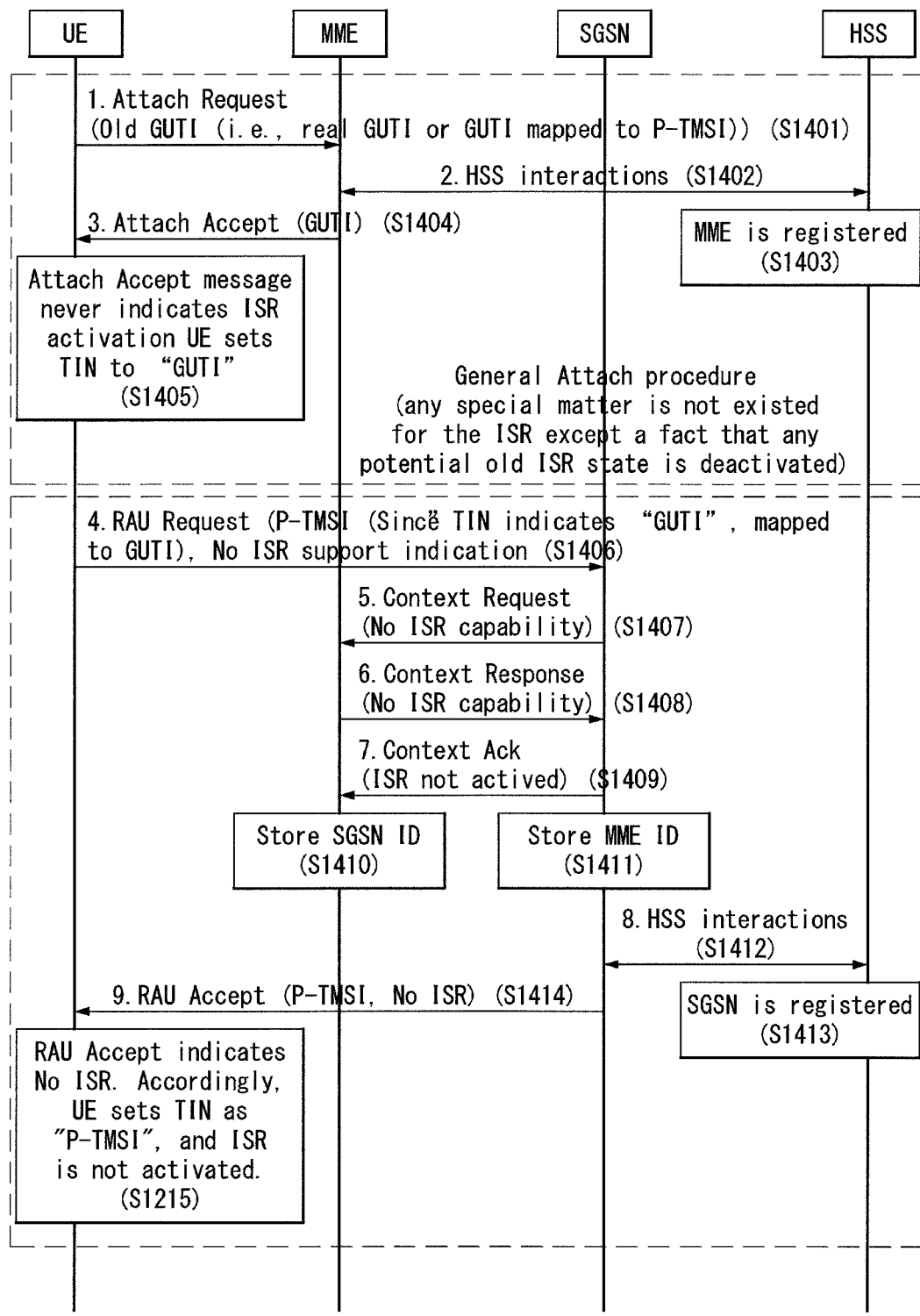

[FIG. 15]
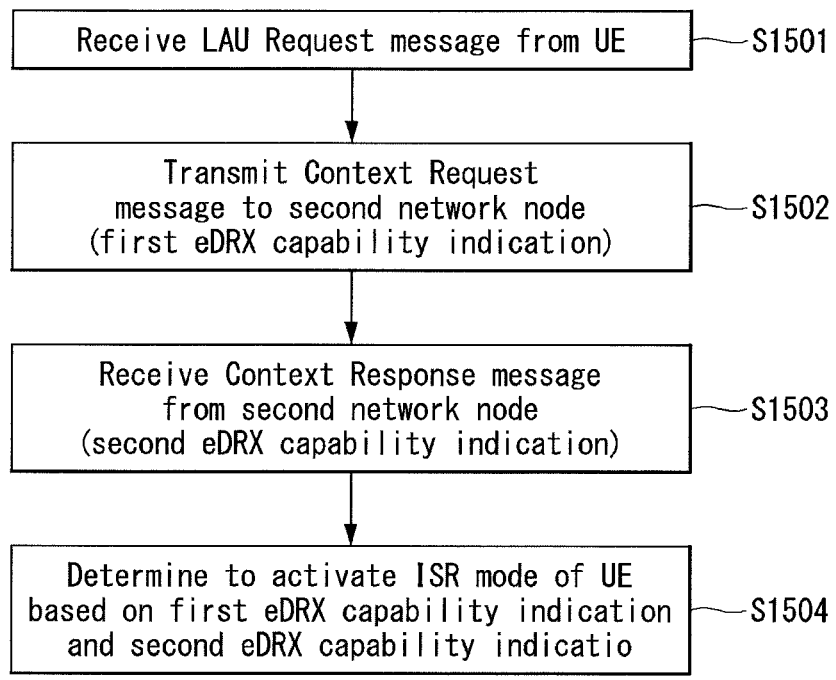
[FIG. 16]
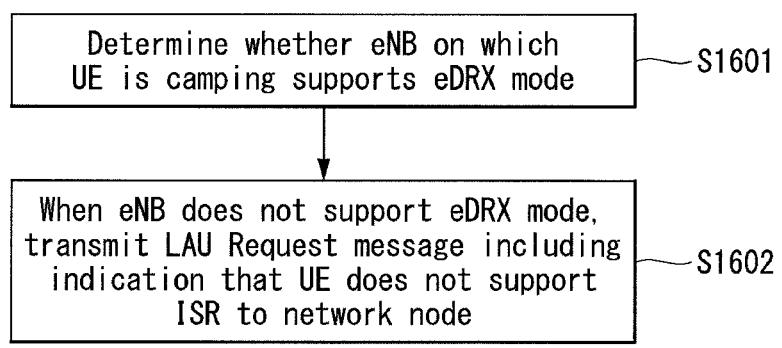

[FIG. 17]
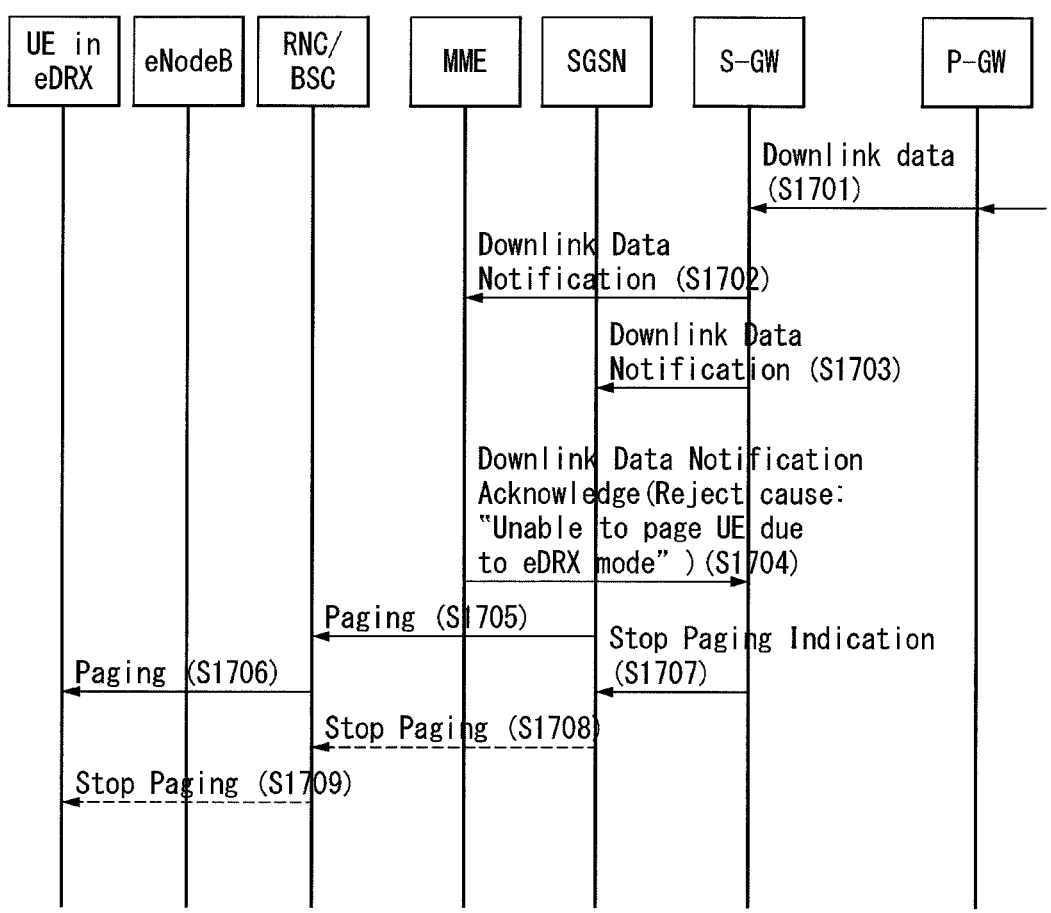

[FIG. 18]
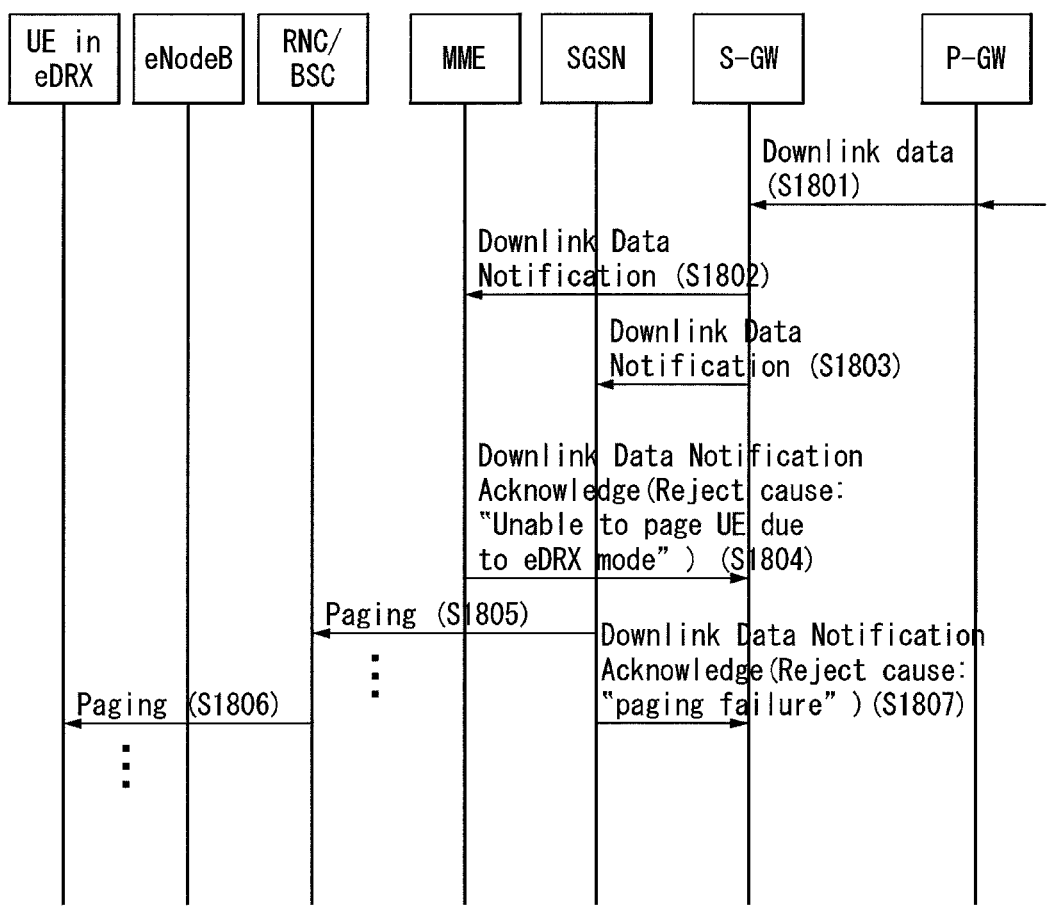

[FIG. 19]
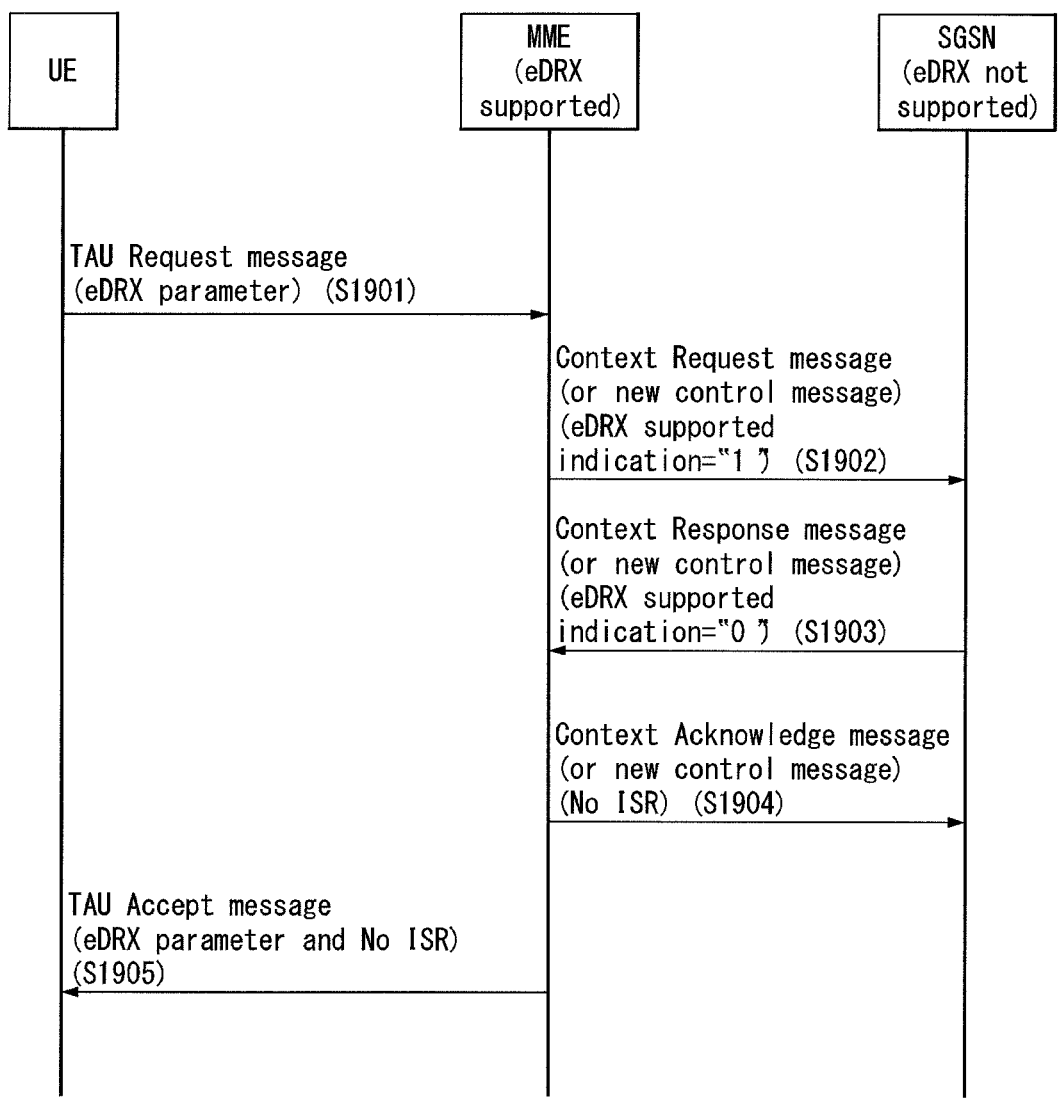

[FIG. 20]
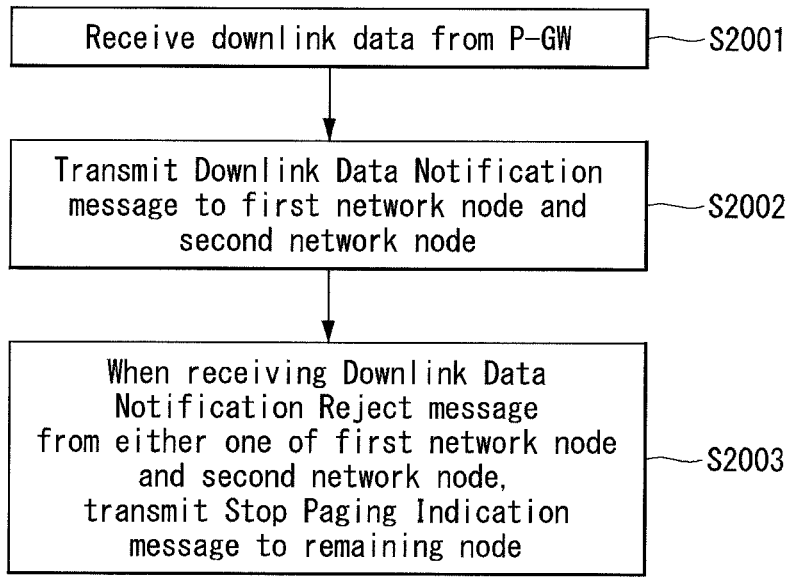
[FIG. 21]
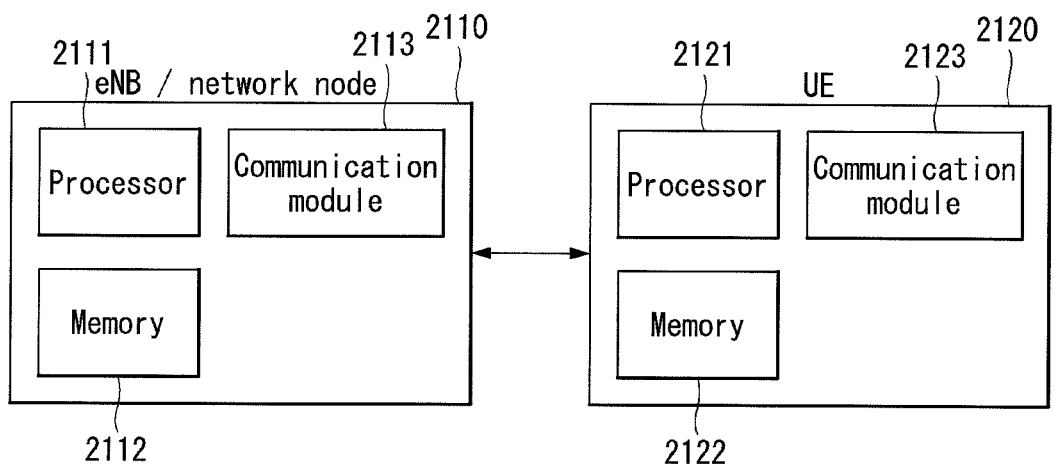

[FIG. 22]
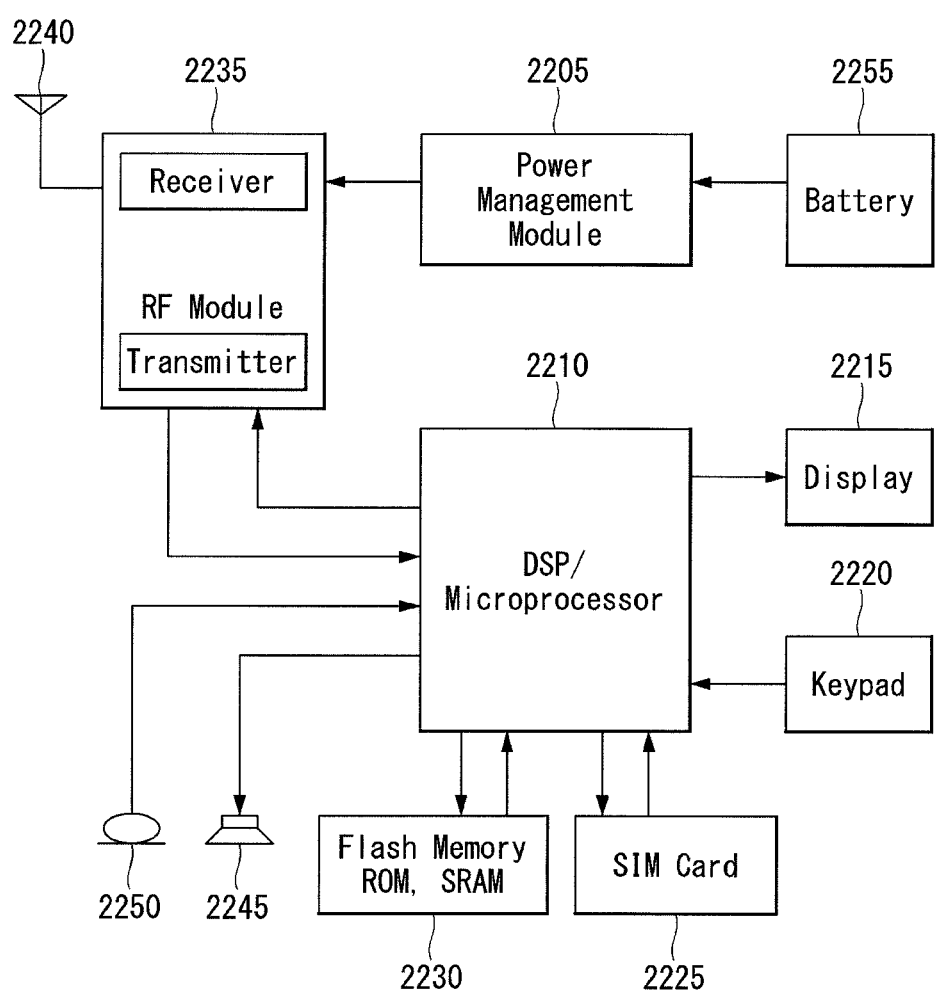

US 10,575,278 B2

METHOD FOR CONTROLLING IDLE-MODE SIGNALING REDUCTION OF TERMINAL IN WIRELESS COMMUNICATION SYSTEM AND APPARATUS FOR THE SAME

CROSS REFERENCE TO RELATED APPLICATIONS

This application is the National Phase of PCT International Application No. PCT/KR2016/011985, filed on Oct. 24, 2016, which claims priority under 35 U.S.C. 119(e) to U.S. Provisional Application No. 62/245,283, filed on Oct. 23, 2015 and No. 62/246,562, filed on Oct. 26, 2015, all of which are hereby expressly incorporated by reference into the present application.

TECHNICAL FIELD

The present invention relates to wireless communications, and more particularly, to a method for controlling an efficient activation/deactivation of Idle-mode signaling reduction (ISR) of a user equipment and a device for supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present invention is to propose a method for processing Idle-mode Signaling Reduction (ISR) activation/deactivation when a user equipment supports Extended Idle mode Discontinuous Reception (eDRX).

In addition, an object of the present invention is to propose a method for controlling paging transmitted to a user equipment in which eDRX and ISR are activated.

Technological objects to be achieved by the present invention are not limited to the aforementioned objects, and other objects that have not been described may be clearly understood by a person having ordinary skill in the art to which the present invention pertains from the following description.

Technical Solution

According to an aspect of the present invention, a method for controlling paging of a user equipment (UE) in which Idle-mode Signaling Reduction (ISR) is activated performed by a Serving Gateway (S-GW) in a wireless communication system may include transmitting a Downlink Data Notification (DDN) message to both of a first network node and a second network node, when receiving downlink data from a Packet Data Network Gateway (P-GW) and, when receiving a DDN Reject message from either one network node of the first network node and the second network node in response to the DDN message, transmitting a Stop Paging Indication message to a remaining network node.

According to another aspect of the present invention, a Serving Gateway (S-GW) for controlling paging of a user equipment (UE) in which Idle-mode Signaling Reduction (ISR) is activated in a wireless communication system may include a communication module for transmitting and receiving a signal and a processor for controlling the communication module, and the processor is configured to perform: transmitting a Downlink Data Notification (DDN) message to both of a first network node and a second network node, when receiving downlink data from a Packet Data Network Gateway (P-GW) and, when receiving a DDN Reject message from either one network node of the first network node and the second network node in response to the DDN message, transmitting a Stop Paging Indication message to a remaining network node.

Preferably, the DDN Reject message may include Unable to transmit paging due to an Extended Idle mode Discontinuous Reception (eDRX) mode of the UE as a rejection cause.

Preferably, a timer may be driven from a timing of receiving the DDN Reject message, and the Stop Paging Indication message may be transmitted after the timer expires.

Preferably, the Stop Paging Indication message may include a Stop Paging Indication due to the eDRX support of the network node that transmits the DDN Reject message as a reject cause.

Preferably, the DDN Reject message may include storing duration information of the downlink data.

Preferably, the downlink data may be stored during the storing duration.

Preferably, a transmission of the DDN message may be pended during the storing duration.

Preferably, when information indicating that the UE is not in the eDRX mode is received from the first network node or the second network node, the DDN message may be transmitted to the first network node and the second network node.

Preferably, when information indicating that the UE is not in the eDRX mode is received from the first network node or the second network node, the DDN message may be transmitted only to the network that transmits the information.

According to another aspect of the present invention, a method for controlling paging of a user equipment (UE) in which Idle-mode Signaling Reduction (ISR) is activated performed by a network node in a wireless communication system may include receiving a Downlink Data Notification (DDN) message from a Serving Gateway (S-GW), transmitting paging to the UE according to the DDN message, driving a timer, when receiving Stop Paging Indication message due to support Extended Idle mode Discontinuous Reception (eDRX) mode of other network node as a rejection cause and stopping the paging transmission after the timer expires.

According to another aspect of the present invention, a network node for controlling paging of a user equipment (UE) in which Idle-mode Signaling Reduction (ISR) is activated in a wireless communication system may include a communication module for transmitting and receiving a signal and a processor for controlling the communication module, and the processor is configured to perform: receiving a Downlink Data Notification (DDN) message from a Serving Gateway (S-GW), transmitting paging to the UE according to the DDN message, driving a timer, when receiving Stop Paging Indication message due to support Extended Idle mode Discontinuous Reception (eDRX) mode of other network node as a rejection cause and stopping the paging transmission after the timer expires.

Technical Effects

According to an embodiment of the present invention, during eDRX operation of the user equipment, ISR activation/deactivation is determined based on proper Non-Access Stratum (NAS) signaling or network process, and accordingly, unnecessary resource waste may be prevented.

In addition, according to an embodiment of the present invention, when operating eDRX and ISR of a user equipment, paging of the user equipment is controlled based on a proper network process, and accordingly, unnecessary resource waste may be prevented.

Effects which may be obtained by the present invention are not limited to the aforementioned effects, and other effects that have not been described may be clearly understood by a person having ordinary skill in the art to which the present invention pertains from the following description.

DESCRIPTION OF DRAWINGS

The accompanying drawings, which are included to provide a further understanding of the present invention and constitute a part of specifications of the present invention, illustrate embodiments of the present invention and together with the corresponding descriptions serve to explain the principles of the present invention.

FIG. 1 is a diagram schematically exemplifying an evolved packet system (EPS) to which the present invention can be applied.

FIG. 2 illustrates an example of evolved universal terrestrial radio access network structure to which the present invention can be applied.

FIG. 3 exemplifies a structure of E-UTRAN and EPC in a wireless communication system to which the present invention can be applied.

FIG. 4 illustrates a structure of a radio interface protocol between a UE and E-UTRAN in a wireless communication system to which the present invention can be applied.

FIG. 5 is a diagram schematically showing a structure of a physical channel in a wireless communication system to which the present invention may be applied.

FIG. 6 is a diagram for describing a contention based random access procedure in a wireless communication system to which the present invention may be applied.

FIG. 7 illustrates a tracking area update procedure with an S-GW change in a wireless communication system to which the present invention may be applied.

FIG. 8 illustrates a procedure for activating Idle Mode Signaling Reduction (ISR) in a wireless communication system to which the present invention may be applied.

FIG. 9 is a diagram illustrating a paging procedure for downlink data forwarding in a wireless communication system to which the present invention may be applied.

FIGS. 10 and 11 are diagrams for describing a problem when using the eDRX mode in a situation that ISR is activated.

FIG. 12 is a diagram illustrating a method for controlling ISR activation/deactivation according to an embodiment of the present invention.

FIG. 13 is a diagram illustrating a method for controlling ISR activation/deactivation according to an embodiment of the present invention.

FIG. 14 is a diagram illustrating a method for controlling ISR activation/deactivation according to an embodiment of the present invention.

FIG. 15 is a diagram illustrating a method for controlling ISR activation/deactivation according to an embodiment of the present invention.

FIG. 16 is a diagram illustrating a method for controlling ISR activation/deactivation according to an embodiment of the present invention.

FIG. 17 is a diagram illustrating a method for paging control according to an embodiment of the present invention.

FIG. 18 is a diagram illustrating a method for paging control according to an embodiment of the present invention.

FIG. 19 is a diagram illustrating a method for ISR activation/deactivation control according to embodiment of the present invention.

FIG. 20 is a diagram illustrating a method for controlling paging according to an embodiment of the present invention.

FIG. 21 illustrates a block diagram of a communication device according to one embodiment of the present invention.

FIG. 22 illustrates a block diagram of a communication device according to one embodiment of the present invention.

BEST MODE FOR INVENTION

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention can be embodied without the specific information.

For some cases, to avoid obscuring the technical principles of the present invention, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by a upper node of the base station depending on situations. In other words, it is apparent that in a network consisting of a plurality of network nodes including a base station, various operations performed for communication with a UE can be performed by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the present invention, and the specific terms can be used in different ways as long as it does not leave the technical scope of the present invention.

The technology described below can be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA can be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA can be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present invention can be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention can be supported by the documents above. Also, all of the terms disclosed in this document can be explained with reference to the standard documents.

To clarify the descriptions, this document is based on the 3GPP LTE/LTE-A, but the technical features of the present invention are not limited to the current descriptions.

Terms used in this document are defined as follows.

Universal Mobile Telecommunication System (UMTS): the 3rd generation mobile communication technology based on GSM, developed by the 3GPP Evolved Packet System (EPS): a network system comprising an Evolved Packet Core (EPC), a packet switched core network based on the Internet Protocol (IP) and an access network such as the LTE and UTRAN. The EPS is a network evolved from the UMTS.

NodeB: the base station of the UMTS network. NodeB is installed outside and provides coverage of a macro cell.

eNodeB: the base station of the EPS network. eNodeB is installed outside and provides coverage of a macro cell.

User Equipment (UE): A UE can be called a terminal, Mobile Equipment (ME), or Mobile Station (MS). A UE can be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

IP Multimedia Subsystem (IMS): a sub-system providing multimedia services based on the IP International Mobile Subscriber Identity (IMSI): a globally unique subscriber identifier assigned in a mobile communication network Machine Type Communication (MTC): communication performed by machines without human intervention. It may be called Machine-to-Machine (M2M) communication.

MTC terminal (MTC UE or MTC device): a terminal (for example, a vending machine, meter, and so on) equipped with a communication function operating through a mobile communication network (For example, communicating with an MTC server via a PLMN) and performing an MTC function MTC server: a server on a network managing MTC terminals. It can be installed inside or outside a mobile communication network. It can provide an interface through which an MTC user can access the server. Also, an MTC server can provide MTC-related services to other servers (in the form of Services Capability Server (SCS)) or the MTC server itself can be an MTC Application Server.

(MTC) application: services (to which MTC is applied) (for example, remote metering, traffic movement tracking, weather observation sensors, and so on)

(MTC) Application Server: a server on a network in which (MTC) applications are performed MTC feature: a function of a network to support MTC applications. For example, MTC monitoring is a feature intended to prepare for loss of a device in an MTC application such as remote metering, and low mobility is a feature intended for an MTC application with respect to an MTC terminal such as a vending machine.

MTC User (MTC User): The MTC user uses the service provided by the MTC server.

MTC subscriber: an entity having a connection relationship with a network operator and providing services to one or more MTC terminals.

MTC group: an MTC group shares at least one or more MTC features and denotes a group of MTC terminals belonging to MTC subscribers.

Services Capability Server (SCS): an entity being connected to the 3GPP network and used for communicating with an MTC InterWorking Function (MTC-IWF) on a Home PLMN (HPLMN) and an MTC terminal. The SCS provides the capability for use by one or more MTC applications.

External identifier: a globally unique identifier used by an external entity (for example, an SCS or an Application Server) of the 3GPP network to indicate (or identify) an MTC terminal (or a subscriber to which the MTC terminal belongs). An external identifier comprises a domain identifier and a local identifier as described below.

Domain identifier: an identifier used for identifying a domain in the control region of a mobile communication network service provider. A service provider can use a separate domain identifier for each service to provide an access to a different service.

Local identifier: an identifier used for deriving or obtaining an International Mobile Subscriber Identity (IMSI). A local identifier should be unique within an application domain and is managed by a mobile communication network service provider.

Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS can perform functions of configuration storage, identity management, user state storage, and so on.

RAN Application Part (RANAP): an interface between the RAN and a node in charge of controlling a core network (in other words, a Mobility Management Entity (MME)/Serving GPRS (General Packet Radio Service) Supporting Node (SGSN)/Mobile Switching Center (MSC)).

Public Land Mobile Network (PLMN): a network formed to provide mobile communication services to individuals. The PLMN can be formed separately for each operator.

Non-Access Stratum (NAS): a functional layer for exchanging signals and traffic messages between a terminal and a core network at the UMTS and EPS protocol stack. The NAS is used primarily for supporting mobility of a terminal and a session management procedure for establishing and maintaining an IP connection between the terminal and a PDN GW.

Service Capability Exposure Function (SCEF): An entity within the 3GPP architecture for service capability exposure that provides a means for securely exposing services and capabilities provided by 3GPP network interfaces.

In what follows, the present invention will be described based on the terms defined above.

Overview of System to which the Present Invention May be Applied

FIG. 1 illustrates an Evolved Packet System (EPS) to which the present invention can be applied.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities can be established through an IP-based base station (for example, eNodeB), EPC, and application domain (for example, IMS). In other words, the EPC provides the architecture essential for implementing end-to-end IP services.

The EPC comprises various components, where FIG. 1 illustrates part of the EPC components, including a Serving Gateway (SGW or S-GW), Packet Data Network Gateway (PDN GW or PGW or P-GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Also, in case the UE moves across serving areas by the eNodeB, the SGW acts as an anchor point for local mobility. In other words, packets can be routed through the SGW to ensure mobility within the E-UTRAN (Evolved-UMTS (Universal Mobile Telecommunications System) Terrestrial Radio Access Network defined for the subsequent versions of the 3GPP release 8). Also, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW can support policy enforcement features, packet filtering, charging support, and so on. Also, the PDN GW can act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and WiMax).

In the example of a network structure as shown in FIG. 1, the SGW and the PDN GW are treated as separate gateways; however, the two gateways can be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Also, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability can access the IP service network (for example, the IMS) that a service provider (namely, an operator) provides, via various components within the EPC based not only on the 3GPP access but also on the non-3GPP access.

Also, FIG. 1 illustrates various reference points (for example, S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points can be defined according to network structures.

TABLE 1

| Reference point | Description |
|---|---|
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

FIG. 2 illustrates one example of an Evolved Universal Terrestrial Radio Access Network (E-UTRAN) to which the present invention can be applied.

The E-UTRAN system is an evolved version of the existing UTRAN system, for example, and is also referred to as 3GPP LTE/LTE-A system. Communication network is widely deployed in order to provide various communication services such as voice (e.g., Voice over Internet Protocol (VoIP)) through IMS and packet data.

Referring to FIG. 2, E-UMTS network includes E-UTRAN, EPC and one or more UEs. The E-UTRAN includes eNBs that provide control plane and user plane protocol, and the eNBs are interconnected with each other by means of the X2 interface.

The X2 user plane interface (X2-U) is defined among the eNBs. The X2-U interface provides non-guaranteed delivery of the user plane Packet Data Unit (PDU). The X2 control plane interface (X2-CP) is defined between two neighboring eNBs. The X2-CP performs the functions of context delivery between eNBs, control of user plane tunnel between a source eNB and a target eNB, delivery of handover-related messages, uplink load management, and so on.

The eNB is connected to the UE through a radio interface and is connected to the Evolved Packet Core (EPC) through the S1 interface.

The S1 user plane interface (S1-U) is defined between the eNB and the Serving Gateway (S-GW). The S1 control plane interface (S1-MME) is defined between the eNB and the Mobility Management Entity (MME). The S1 interface performs the functions of EPS bearer service management, non-access stratum (NAS) signaling transport, network sharing, MME load balancing management, and so on. The S1 interface supports many-to-many-relation between the eNB and the MME/S-GW.

The MME may perform various functions such as NAS signaling security, Access Stratum (AS) security control, Core Network (CN) inter-node signaling for supporting mobility between 3GPP access network, IDLE mode UE reachability (including performing paging retransmission and control), Tracking Area Identity (TAI) management (for UEs in idle and active mode), selecting PDN GW and SGW, selecting MME for handover of which the MME is changed, selecting SGSN for handover to 2G or 3G 3GPP access network, roaming, authentication, bearer management function including dedicated bearer establishment, Public Warning System (PWS) (including Earthquake and Tsunami Warning System (ETWS) and Commercial Mobile Alert System (CMAS), supporting message transmission and so on.

FIG. 3 exemplifies a structure of E-UTRAN and EPC in a wireless communication system to which the present invention can be applied.

Referring to FIG. 3, an eNB may perform functions of selecting gateway (e.g., MME), routing to gateway during radio resource control (RRC) is activated, scheduling and transmitting broadcast channel (BCH), dynamic resource allocation to UE in uplink and downlink, mobility control connection in LTE_ACTIVE state. As described above, the gateway in EPC may perform functions of paging origination, LTE_IDLE state management, ciphering of user plane, bearer control of System Architecture Evolution (SAE), ciphering of NAS signaling and integrity protection.

FIG. 4 illustrates a radio interface protocol structure between a UE and an E-UTRAN in a wireless communication system to which the present invention can be applied.

FIG. 4(a) illustrates a radio protocol structure for the control plane, and FIG. 4(b) illustrates a radio protocol structure for the user plane.

With reference to FIG. 4, layers of the radio interface protocol between the UE and the E-UTRAN can be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Also, the PDCCH can carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PHICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, in case the MAC layer performs the RLC function, the RLC layer can be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and contains unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers can be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells can be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service can be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

Logical channels, which are located above the transport channels and are mapped to the transport channels. The logical channels may be distinguished by control channels for delivering control area information and traffic channels for delivering user area information. The control channels include a Broadcast Control Channel (BCCH), a Paging Control Channel (PCCH), a Common Control Channel (CCCH), a dedicated control channel (DCCH), a Multicast Control Channel (MCCH), and etc. The traffic channels include a dedicated traffic channel (DTCH), and a Multicast Traffic Channel (MTCH), etc. The PCCH is a downlink channel that delivers paging information, and is used when network does not know the cell where a UE belongs. The CCCH is used by a UE that does not have RRC connection with network. The MCCH is a point-to-multipoint downlink channel which is used for delivering Multimedia Broadcast and Multicast Service (MBMS) control information from network to UE. The DCCH is a point-to-point bi-directional channel which is used by a UE that has RRC connection delivering dedicated control information between UE and network. The DTCH is a point-to-point channel which is dedicated to a UE for delivering user information that may be existed in uplink and downlink. The MTCH is a point-to-multipoint downlink channel for delivering traffic data from network to UE.

In case of uplink connection between the logical channel and the transport channel, the DCCH may be mapped to UL-SCH, the DTCH may be mapped to UL-SCH, and the CCCH may be mapped to UL-SCH. In case of downlink connection between the logical channel and the transport channel, the BCCH may be mapped to BCH or DL-SCH, the PCCH may be mapped to PCH, the DCCH may be mapped to DL-SCH, the DTCH may be mapped to DL-SCH, the MCCH may be mapped to MCH, and the MTCH may be mapped to MCH.

FIG. 5 is a diagram schematically exemplifying a structure of physical channel in a wireless communication system to which the present invention can be applied.

Referring to FIG. 5, the physical channel delivers signaling and data through radio resources including one or more subcarriers in frequency domain and one or more symbols in time domain.

One subframe that has a length of 1.0 ms includes a plurality of symbols. A specific symbol (s) of subframe (e.g., the first symbol of subframe) may be used for PDCCH. The PDCCH carries information for resources which are dynamically allocated (e.g., resource block, modulation and coding scheme (MCS), etc.).

Random Access Procedure

Hereinafter, a random access procedure which is provided in a LTE/LTE-A system will be described.

The random access procedure is performed in case that the UE performs an initial access in a RRC idle state without any RRC connection to an eNB, or the UE performs a RRC connection re-establishment procedure, etc.

The LTE/LTE-A system provides both of the contention-based random access procedure that the UE randomly selects to use one preamble in a specific set and the non-contention-based random access procedure that the eNB uses the random access preamble that is allocated to a specific UE.

FIG. 6 is a diagram for describing the contention-based random access procedure in the wireless communication system to which the present invention can be applied.

(1) Message 1 (Msg 1)

First, the UE randomly selects one random access preamble (RACH preamble) from the set of the random access preamble that is instructed through system information or handover command, selects and transmits physical RACH (PRACH) resource which is able to transmit the random access preamble.

The eNB that receives the random access preamble from the UE decodes the preamble and acquires RA-RNTI. The RA-RNTI associated with the PRACH to which the random access preamble is transmitted is determined according to the time-frequency resource of the random access preamble that is transmitted by the corresponding UE.

(2) Message 2 (Msg 2)

The eNB transmits the random access response that is addressed to RA-RNTI that is acquired through the preamble on the Msg 1 to the UE. The random access response may include RA preamble index/identifier, UL grant that informs the UL radio resource, temporary cell RNTI (TC-RNTI), and time alignment command (TAC). The TAC is the information indicating a time synchronization value that is transmitted by the eNB in order to keep the UL time alignment. The UE renews the UL transmission timing using the time synchronization value. On the renewal of the time synchronization value, the UE renews or restarts the time alignment timer. The UL grant includes the UL resource allocation that is used for transmission of the scheduling message to be described later (Message 3) and the transmit power command (TPC). The TCP is used for determination of the transmission power for the scheduled PUSCH.

The UE, after transmitting the random access preamble, tries to receive the random access response of its own within the random access response window that is instructed by the eNB with system information or handover command, detects the PDCCH masked with RA-RNTI that corresponds to PRACH, and receives the PDSCH that is indicated by the detected PDCCH. The random access response information may be transmitted in a MAC packet data unit and the MAC PDU may be delivered through PDSCH.

The UE terminates monitoring of the random access response if successfully receiving the random access response having the random access preamble index/identifier same as the random access preamble that is transmitted to the eNB. Meanwhile, if the random access response message has not been received until the random access response window is terminated, or if not received a valid random access response having the random access preamble index same as the random access preamble that is transmitted to the eNB, it is considered that the receipt of random access response is failed, and after that, the UE may perform the retransmission of preamble.

(3) Message 3 (Msg 3)

In case that the UE receives the random access response that is effective with the UE itself, the UE processes the information included in the random access response respectively. That is, the UE applies TAC and stores TC-RNTI. Also, by using UL grant, the UE transmits the data stored in the buffer of UE or the data newly generated to the eNB.

In case of the initial access of UE, the RRC connection request that is delivered through CCCH after generating in RRC layer may be transmitted with being included in the message 3. In case of the RRC connection reestablishment procedure, the RRC connection reestablishment request that is delivered through CCCH after generating in RRC layer may be transmitted with being included in the message 3. Additionally, NAS access request message may be included.

The message 3 should include the identifier of UE. There are two ways how to include the identifier of UE. The first method is that the UE transmits the cell RNTI (C-RNTI) of its own through the UL transmission signal corresponding to the UL grant, if the UE has a valid C-RNTI that is already allocated by the corresponding cell before the random access procedure. Meanwhile, if the UE has not been allocated a valid C-RNTI before the random access procedure, the UE transmits including unique identifier of its own (for example, S-TMSI or random number). Normally the above unique identifier is longer that C-RNTI.

If transmitting the data corresponding to the UL grant, the UE initiates a contention resolution timer.

(4) Message 4 (Msg 4)

The eNB, in case of receiving the C-RNTI of corresponding UE through the message 3 from the UE, transmits the message 4 to the UE by using the received C-RNTI. Meanwhile, in case of receiving the unique identifier (that is, S-TMSI or random number) through the message 3 from the UE, the eNB transmits the 4 message to the UE by using the TC-RNTI that is allocated from the random access response to the corresponding UE. For example, the 4 message may include the RRC connection setup message.

The UE waits for the instruction of eNB for collision resolution after transmitting the data including the identifier of its own through the UL grant included the random access response. That is, the UE attempts the receipt of PDCCH in order to receive a specific message. There are two ways how to receive the PDCCH. As previously mentioned, in case that the message 3 transmitted in response to the UL grant includes C-RNTI as an identifier of its own, the UE attempts the receipt of PDCCH using the C-RNTI of itself, and in case that the above identifier is the unique identifier (that is, S-TMSI or random number), the UE tries to receive PDCCH using the TC-RNTI that is included in the random access response. After that, in the former case, if the PDCCH is received through the C-RNTI of its own before the contention resolution timer is terminated, the UE determines that the random access procedure is performed and terminates the procedure. In the latter case, if the PDCCH is received through the TC-RNTI before the contention resolution timer is terminated, the UE checks on the data that is delivered by PDSCH, which is addressed by the PDCCH. If the content of the data includes the unique identifier of its own, the UE terminates the random access procedure determining that a normal procedure has been performed. The UE acquires C-RNTI through the 4 message, and after that, the UE and network are to transmit and receive a UE-specific message by using the C-RNTI.

Meanwhile, the operation of the non-contention-based random access procedure, unlike the contention-based random access procedure illustrated in FIG. 11, is terminated with the transmission of message 1 and message 2 only. However, the UE is going to be allocated a random access preamble from the eNB before transmitting the random access preamble to the eNB as the message 1. And the UE transmits the allocated random access preamble to the eNB as the message 1, and terminates the random access procedure by receiving the random access response from the eNB.

Terms used in the following description are defined as follows.

Home NodeB: A base station of a UMTS network, which is installed indoors and has a coverage corresponding to a micro cell.

Home eNodeB: A base station of an EPS network, which is installed indoors and has a coverage corresponding to a micro cell.

Open Mobile Alliance Device Management (OMA DM): A protocol designed for managing mobile devices such as a cellular phone, a PDA, a portable computer, and the like, and performs a function of device configuration, firmware upgrade, error report, and so on.

Operation Administration and Maintenance (OAM): This means a network defect indication, performance information and a network management functional group that provides data and diagnostic function.

NAS configuration Management Object (MO): This means a management object (MO) used for configuring parameters associated with NAS functionality to a UE.

Packet Data Network (PDN): This means a network on which a server supporting a specific service (e.g., Multimedia Messaging Service (MMS) server, Wireless Application Protocol (WAP) server or the like) is located.

PDN connection: A connection between a UE and a PDN, and means an association (connection) of a UE represented by an Internet Protocol (IP) address and a PDN represented by Access Point Name (APN).

Access Point Name (APN): This means a string that designates or distinguishes a PDN. A UE goes through a corresponding P-GW in order to access a service or network (i.e., PDN) requested by the UE, and this means a predefined name (string) (e.g., internet.mnc012.mcc345.gprs) in a network in order to find the P-GW.

Non-Access-Stratum (NAS): This means a higher stratum of a control plane between a UE and an MME. This supports a mobility management and session management, IP address maintenance, and so on between a UE and a network.

Access-Stratum (AS): This includes a protocol stack between a UE and a wireless (or access) network, and takes charge of transmission of data and network control signal, and the like.

Tracking Area Update (TAU) Procedure

FIG. 7 illustrates a tracking area update procedure with an S-GW change in a wireless communication system to which the present invention may be applied.

TAU procedure may be performed in the case that it is detected that a UE enters a new Tracking Area (TA) which was not existed in a list of Tracking Area Identity (Identities) registered in a network, a periodic TAU timer expires, a Temporary Identity used in Next update (TIN) which is going to be used in a next update indicates a Packet-Temporary Mobile Subscriber Identity (P-TMSI) when a UE selects an E-UTRAN, and so on.

FIG. 7 exemplifies a case of TAU procedure between MMEs (inter-MME).

1-3. in the case that a TAU timer of a UE in ECM-IDLE state expires or the UE moves to another tracking area, the TAU procedure for reporting a tracking area (TA) to an MME is triggered.

The UE starts a TAU procedure by transmitting a TAU Request message to the MME.

The TAU Request message is forwarded with being included in an RRC Connection Setup Complete message in an RRC connection, and forwarded with being included in an Initial UE message in S1 signaling connection.

In the case that it is required to use eDRX, even in the case that eDRX parameter is already negotiated in advance, eDRX parameter(s) information is included in the TAU Request message.

4. In the case that the MME that receives the TAU Request message is different from an old node (i.e., MME or SGSN) (i.e., the case that the MME is changed), a new MME transmits a Context Request message to the old MME/SGSN in order to obtain information of UE from the old MME/SGSN.

In the case that the new MME supports the Idle mode signaling reduction (ISR), the Context Request message may include indication information indicating that the ISR is supported (i.e., ISR supported).

5. When the Context Request message is transmitted to the old MME/SGSN, the old MME/SGSN responds with a Context Response message.

At this time, the old MME/SGSN indicates whether a DL data forwarding is requested (i.e., in the case that it is requested, "DL data forwarding required") to the new MME (SGSN in the case of RAU procedure).

In the case that the new MME supports the Idle mode signaling reduction (ISR), the Context Request message may include indication information indicating that the ISR is supported (i.e., ISR supported).

6. The UE, the new MME and an HSS perform an authentication function and a security (or ciphering) procedure.

The new MME determines whether to relocate an S-GW. When a previous S-GW is unable to provide a service to the UE any more, the S-GW is relocated. In addition, in the case that the new S-GW provides a service to the UE for longer time and/or it is expected that a P-GW path is more suitable to the UE or the new S-GW co-locates with the P-GW, the new MME may determine to move to the S-GW.

7. In the case that the MME selects a new S-GW, the MME transmits a Create Session Request message to the new S-GW which is selected for each PDN connection.

At this time, in the case that the new MME (SGSN in the case of RAU procedure) receives "DL data forwarding required" in step 5 above, the new MME (SGSN in the case of RAU procedure) requests to assign a new S-GW temporary IP address (IP@) and TEID in order to forward DL data by forwarding the "DL data forwarding required".

8. If necessary, the new S-GW transmits a Modify Bearer Request message for each PDN connection to the P-GW.

9a. If necessary, the P-GW may perform an IP connectivity access network session modification procedure with a PCRF.

9. In the case that the P-GW receives the Modify Bearer Request message from the new S-GW, in response to this, the P-GW transmits a Modify Bearer Response message to the new S-GW.

10. The new S-GW updates its own bearer context. Due to this, the new S-GW may perform routing the bearer PDU to the P-GW when receiving the bearer PDU from the BS.

The new S-GW transmits a Create Session Response message to the new MME in response to the Create Session Request.

At this time, the new S-GW forwards the temporary IP address (IP@) and TEID allocated for a DL data forwarding to the new MME through a Creation Session Response message.

11. The new MME transmits a Context Acknowledge message to the old MME/SGSN.

In the case that the MME selects the new S-GW, the MME forwards modification indication information of the S-GW to the old MME/SGSN through the Context Acknowledge message.

At this time, the new MME forwards the temporary IP address (IP@) and TEID allocated for a DL data forwarding through a Create Session Response message to the old MME/SGSN.

12. The new MME transmits an Update Location Request message to the HSS.

13. The HSS transmits a Cancel Location message to the old MME/SGSN.

14. The old MME/SGSN transmits a Cancel Location Acknowledge message to the HSS in response to the Cancel Location message.

15. In the case that the old SGSN receives the Context Acknowledge message and the UE is connected through Iu interface, the old SGSN transmits an Iu Release command message to an RNC.

16. The RNC transmits an Iu Release Complete message to the old SGSN in response to the Iu Release command message.

17. The HSS transmits an Update Location Acknowledge message to the new MME in response to the Update Location Request message.

18. In the case that the S-GW modification indication is received in the Context Acknowledge message of step 11, the old MME/SGSN transmits a Delete Session Request message to the old S-GW, and releases the MME or SGSN EPS bearer resource.

At this time, the old MME/SGSN transmits the temporary IP address (IP@) and TEID allocated for a DL data forwarding to the old S-GW through the Delete Session Request message.

19. The old S-GW transmits a Delete Session Response message to the old MME/SGSN in response to the Delete Session Request message.

20. The new MME transmits a TAU Accept message to the UE. At this time, in the case that the MME allocates a new Globally Unique Temporary Identity (GUTI) to the UE, the allocated GUTI may be included in the TAU Accept message.

When the UE includes eDRX parameter(s) information in the TAU Request message, the MME includes the eDRX parameter(s) information in the TAU Accept message in the case that the MME determines to activate the eDRX.

In the case that the UE receives the TAU Accept message and ISR Activated indication is not included in the TAU Accept message, the UE sets TIN to Globally Unique Temporary Identity (GUTI).

21. In the case that the GUTI is included in the TAU Accept message, the UE transmits a TAU Complete message to the MME in response to the TAU Accept message.

22. The old S-GW forwards a buffered DL packet to the new S-GW, and transmits an End Marker packet indicating that there is no more data to forward to the new S-GW.

Idle Mode Signaling Reduction (ISR)

The Idle mode signaling reduction (ISR) function provides a mechanism for limiting signaling during an inter-Radio Access Technology (RAT) cell reselection in an idle mode (ECM-IDLE, PMM-IDLE, GPRS STANDBY state, etc.).

An MME/SGSN activates the ISR only in the case that an S-GW supports the ISR.

The ISR is activated by a determination of a Core Network (CN) node, and explicitly signaled to a UE as "ISR activated" in a RAU Accept message or a TAU Accept message. The UE may obtain a valid Mobility Management (MM) parameter from the MME and the SGSN. "Temporary Identity used in Next update (TIN)" is a parameter of the MM context of the UE, and identifies a UE identifier that the UE should indicate in the next RAU Request, TAU Request or Attach Request message. The TIN also identifies a state of ISR activation in the UE.

The TIN may correspond to one of three values, "Packet-Temporary Mobile Subscriber Identity (P-TMSI)", "Globally Unique Temporary Identity (GUTI)" or "RAT-related TMSI". The UE sets the TIN according to the rules as represented in Table 2 below when receiving an Attach Accept, TAU Accept or RAU Accept message.

Table 2 exemplifies setting rules of the TIN.

TABLE 2

| Message received by UE | Current TIN value stored in UE | TIN value set by UE when receiving message |
|---|---|---|
| Attach Accept through E-UTRAN (Does not indicate "ISR Activated") | Arbitrary value | GUTI |
| Attach Accept through GERAN/UTRAN (Does not indicate "ISR Activated") | Arbitrary value | P-TMSI |
| TAU Accept not indicating "ISR Activated" | Arbitrary value | GUTI |
| TAU Accept indicating "ISR Activated" | GUTI P-TMSI or RAT-related TMSI | GUTI RAT-related TMSI |
| RAU Accept not indicating "ISR Activated" | Arbitrary value | P-TMSI |
| RAU Accept indicating "ISR Activated" | P-TMSI GUTI or RAT-related TMSI | P-TMSI RAT-related TMSI |

The fact that "ISR Activated" is indicated by RAU/TAU Accept but the UE does not set the TIN as "RAT-related TMSI" corresponds to a special situation. Here, the UE is in the state of deactivating the ISR due to a control of the special situation. By maintaining the old TIN value, the UE remembers to use RAT-specific TMSI indicated by the TIN when updating with a CN node of other RAT.

Only in the case that the TIN is set as "RAT-related TMSI", the ISR operation is activated in the UE. That is, the UE may be modified between all registered areas and RAT without any signaling update, and may hear paging in the camped-on RAT. In the case that the TIN is set as "RAT-related TMSI", P-TMSI and Routing Area Identity (RAT)/

RATs as well as GUTI and Tracking Area Identity (TAI)/TAIs are also maintained in the registered network, and also maintained in valid state even in the UE.

Table 3 exemplifies temporary UE identities that the UE is needed to indicate in Attach Request, TAU/RAU Request (as "old GUTI" or "old P-TMSI/RAI").

TABLE 3

| Message received by UE | TIN value: P-TMSI | TIN value: GUTI | TIN value: RAT-related TMSI |
|---|---|---|---|
| TAU Request | GUTI mapped to P-TMSI/RAI | GUTI | GUTI |
| RAU Request | P-TMSI/RAI | P-TMSI/RAI mapped to GUTI | P-TMSI/RAI |
| Attach Request via E-UTRAN | P-TMSI/RAI mapped to GUTI | GUTI | GUTI |
| Attach Request via GERAN/UTRAN | P-TMSI/RAI | P-TMSI/RAI mapped to GUTI | P-TMSI/RAI |

Table 3 represents temporary identities that are needed to be indicated in Attach Request, TAU/RAU Request when a UE stores these as valid parameters.

Unsynchronized state information may be generated in a UE, an MME and an SGSN. When this special situation occurs, ISR is deactivated locally in a UE.

A UE deactivates ISR by setting its own TIN as a temporary identifier of RAT in the following special situations.

Before ISR is activated in a UE, a situation in which an EPS bearer context or a packet data protocol (PDP) context is modified;

When a UE moves from E-UTRAN to GERAN/UTRAN with means except packet switched handover (PSHO) or moves from GERAN/UTRAN to E-UTRAN, a situation if an EPS bearer context or a PDP context is existed after ISF in the UE is activated;

When a UE moves from GERAN/UTRAN to E-UTRAN with means except single radio voice call continuity (SRVCC) from PSHO, circuit-switched (CS) to a packet-switched (PS), a situation if a PDP context is suspended in GERAN before going back to E-UTRAN and not successfully resumed again on the corresponding timing;

With respect to a change of UE-specific DRX parameter, a situation after it is updated in an MME or an SGSN in order to guarantee that another CN node is also updated;

With respect to a change of UE Core Network Capability, a situation after it is updated in an MME or an SGSN in order to guarantee that another CN node is also updated;

A situation in which E-UTRAN is selected by a UTRAN-connected UE;

A situation in which E-UTRAN is selected in GERAN READY state;

A situation in which GERAN is selected by E-UTRAN-connected UE through a Cell Change Order, not for CS fallback;

When a UE has CS fallback and/or SMS, a situation after location area update (LAU) procedure;

In the case of a UE registered in IMS for voice, a situation in which a UE moves from a Registration Area that supports IMS voice through a PS session to an area otherwise, or the reverse situation;

In the following special situations, a UE deactivates ISR locally by setting its own TIN as a temporary identifier of a still usable RAT to the corresponding UE.

Due to the reason why coverage of RAT is lost or the coverage is not selected any more by a UE (this may give birth to an implicit detach by an SGSN or an MME), a situation after RAT-specific Deactivated ISR timer expires;

In the following special situations, by using a general update signaling (i.e., signaling of "ISR Activated" is omitted), the ISR in a UE is deactivated by CN node.

Due to a change of CN node, a situation in which context forwarding between CN nodes (from an SGSN to an SGSN or from an MME to an MME) of the same type is caused;

A situation in which an S-GW is changed;

A situation in which a UE has only a bearer in relation to an urgent bearer service;

When a UE moves between a local network and a macro network without mobility supported in a core network, TAU or RAU;

When a network confirms a use of PSM to a UE, TAU or RAU;

In the case that a tracking area or routing area list covers both of a local network or a macro network, when a UE is allowed to use SIPTO in the local network and S-GW relocation without mobility is supported, the ISR is not activated.

Idle Mode Signaling Reduction (ISR)

The Idle mode Signaling Reduction (ISR) is a function that a UE may move between LTE (E-UTRAN) and 2G (GERAN)/3G (UTRAN) without performing Tracking Area (TA) or Routing Area (RA) update. Generally, since cell coverage of LTE is small and cell coverage of 2G/3G is large, idle-mode mobility occurs frequently between Radio Access Technologies (RATs). Accordingly, by using the ISR, signaling overhead between a UE and a network or in a network may be reduced.

In order the ISR to be activated, a UE, network nodes (SGSN, MME, S-GW and HSS) should support the ISR. The ISR support of a UE is mandatory according to the standard but the ISR support of a network node is optional.

FIG. 8 illustrates a procedure for activating Idle Mode Signaling Reduction (ISR) in a wireless communication system to which the present invention may be applied.

1. The procedure for ISR activation starts a general Attach procedure, not requesting a special function for supporting the ISR.

A UE starts the Attach procedure by transmitting an Attach Request message to an MME. The Attach Request message includes an old GUTI (i.e., real GUTI or GUTI mapped to P-TMSI).

However, the Attach procedure deletes old ISR state information stored in the UE. Together with the Attach Request message, the UE sets a Temporary Identity used in Next update (TIN) to GUTI.

2. After attaching to the MME, the UE may perform an interaction through E-UTRAN without changing ISR state. The MME requests and receives information for authentication to an HSS for UE authentication, and performs mutual authentication. Later, the MME is registered in the HSS.

3. In response to the Attach Request message, the MME transmits an Attach Accept message to the UE.

The Attach Accept message includes GUTI. At this time, the Attach Accept message never indicates ISR activation. Accordingly, the UE sets TIN to GUTI.

Step 1 to step 3 correspond to a general Attach procedure in which any special matter is not existed for the ISR except a fact that any potential old ISR state is deactivated.

That is, the ISR is maintained as deactivated state. One or more bearer contexts are activated on the MME, an S-GW and a PDN GW.

4. When the UE reselects GERAN or UTRAN initially, the UE starts RAU procedure by transmitting a RAU Request message to an SGSN.

This represents a timing of activating the ISR. TIN indicates "GUTI", and accordingly, the UE indicates the P-TMSI mapped to GUTI in the RAU Request.

5-6. The SGSN transmits a Context Request message to the MME, and receives a Context Response message from the MME in response to the Context Request message, and accordingly, the SGSN obtains context from the MME.

At this time, when the MME transmits context to the SGSN, only in the case that its own involved S-GW supports the ISR, the MME includes ISR support indication.

7. The SGSN transmits a Context Ack message to the MME. When the ISR is activated, the SGSN indicates that the ISR is activated (ISR active) in the Context Ack message.

When the ISR is activated, since the ISR is activated, both of the CN nodes (i.e., the SGSN and the MME) maintain these contexts. The MME stores an SGSN ID and the SGSN stores an MME ID.

8. The SGSN establishes a control relation with the S-GW, and in this case, in the SGSN, the control relation with the S-GW is activated with a control connection between the MME and the S-GW. That is, the MME and the SGSN are registered in the HSS together.

9. In response to the RAU Request message, the SGSN transmits a RAU Accept message to the UE.

At this time, the RAU Accept indicates ISR activation to the UE. Accordingly, the UE maintains the registered GUTI and P-TMSI, and the UE sets TIN as "RAT-related TMSI".

Step 4 to step 9 above exemplify a RAU procedure accompanying the ISR activation. The UE has a valid MM context for the SGSN and the MME, the SGSN and the MME have a valid MM registration from the UE, and the SGSN and the MME are registered in the HSS.

After the ISR activation, the UE may reselect between E-UTRAN and UTRAN/GERAN without the need for network update unless the UE gets out of the registered RA(s)/TA(s).

A network is not requested to activate the ISR during RAU and TAU, but the network may activate the ISR in any RAU or TAU that includes a context forwarding between the SGSN and the MME.

FIG. 8 illustrates a RAU procedure, but a TAU procedure for ISR activation for a UE attached to GERAN/UTRAN already may operate in a very similar manner. That is, a procedure for the ISR to be activated is as below.

1) A UE is registered in GERAN/UTRAN.

2) When the UE moves to an LTE cell, the UE performs Tracking Area Updating (TAU) procedure.

3) An MME requests UE context and informs that the ISR is supportable to an SGSN.

4) The SGSN responds to the MME that the UE context and the ISR are supportable to the MME.

5) An S-GW receives a report that the UE is registered and the ISR is activated from the MME.

6) An HSS may be updated for an MME address. In this case, the update type indicates that the HSS does not cancel an SGSN location.

7) The MME informs that the ISR is activated to the UE through a TAU Accept message.

First, when the ISR is activated (when the UE receives the ISR activated indication in the TAU Accept message from the MME), the UE may select LTE(E-UTRAN) and 2G(GERAN)/3G(UTRAN) RAT until the ISR is deactivated without a need of transmitting any signaling to a network in an idle state.

The ISR activation is needed to be updated whenever RAU/TAU procedures are performed. That is, the UE deactivates the ISR in the case that the ISR activated indication is not existed in the TAU/RAU Accept messages received from the MME/SGSN.

The UE and the network (MME/SGSN) operate a periodic update timer (e.g., T3412 for E-UTRAN and T3312 for GERAN/UTRAN) for E-UTRAN and GERAN/UTRAN independently. Accordingly, when the periodic update timer in relation to the corresponding network expires while the UE is camping on the corresponding network, the UE performs periodic TAU (P-TAU; for T3412) or periodic RAU (P-RAU; for T3312).

In the case that the P-RAU timer (T3312) expires while the UE is camping on LTE, the UE does not perform P-RAU. In this case, the UE operates a deactivate ISR timer (T3323) for GERAN/UTRAN. In the case that T3323 expires, the UE deactivates the ISR.

On the other hand, the P-TAU timer (T3412) expires while the UE is camping on GERAN/UTRAN, the UE does not perform P-TAU. In the case, the UE operate a deactivate ISR timer (T3423) for E-UTRAN. In the case that T3423 expires, the UE deactivates the ISR.

In the case that a network (i.e., MME/SGSN) is unable to be reported P-TAU/RAU from the UE, it is regarded that the UE is unreachable in the network. For this, the network operates a mobile reachable timer (generally, set as 4 minutes+a value of T3412/T3312). When the mobile reachable timer expires, the network operates an implicit detach timer. In the case that the implicit detach timer expires, finally, the network regards the UE is unreachable and detaches the corresponding UE.

Hereinafter, when DL data is transmitted to a UE in an ISR activated situation, a paging procedure will be described.

FIG. 9 is a diagram illustrating a paging procedure for downlink data forwarding in a wireless communication system to which the present invention may be applied.

1. When downlink data arrives at a P-GW from an external network, the P-GW forwards the downlink data to an S-GW.

2. In the case that downlink S1 bearer is released (i.e., ECM-IDLE state) and it is unavailable to transmit the DL data to an eNB (i.e., in the case that 'S1 eNB TEID' value is not existed in the S-GW, the S-GW buffers the received downlink data. Further, the S-GW transmits a Downlink Data Notification (DDN) message to MME/SGSN in which the UE is registered for a signaling connection and a bearer configuration for the corresponding UE.

The MME/SGSN transmits a Downlink Data Notification ACK message to the S-GW in response to the DDN message.

3. The MME/SGSN transmits a paging message to all eNBs/RNCs (or Base Station Controllers (BSCs)) belonged to a tracking area that the UE registered most recently.

4. When receiving the paging message from the eNB/RNC (or BSC), the eNB/RNC (or BSC) broadcasts the paging message.

5. The UE that detects that there is downlink data toward the UE itself performs a service request procedure in response to the paging in the network in which the UE itself is camping on.

FIG. 9 exemplifies the case that the UE is camping on E-UTRAN, and the UE transmits a Service Request message to the MME and starts a service request procedure, thereby configuring an ECM connection.

6. The MME performs a User Plane Setup procedure of the UE through signaling with the eNB and signaling with the S-GW.

More particularly, the MME transmits an Initial Context Setup Request message to the eNB such that the eNB configures S1 bearer with the S-GW and configures a DRB with the UE. The eNB transmits an RRC Connection Reconfiguration message to the UE in order to generate a DRB.

When this procedure is ended, a generation of DRB between the eNB and the UE is completed, and an uplink EPS bearer is setup throughout the UE to the P-GW. The UE may transmit uplink traffic to the P-GW.

The eNB transmits an Initial Context Setup Complete message including 'S1 eNB TEID' to the MME in response to the Initial Context Setup Request message.

The MME forwards the 'S1 eNB TEID' received from the eNB to the S-GW through a Modify Bearer Request message.

When this procedure is ended, a generation of downlink S1 bearer is completed between the eNB and the S-GW, and downlink EPS bearer is setup throughout the P-GW to the UE. The UE may receive downlink traffic from the P-GW.

As such, the downlink data connection (i.e., user plane setup) is setup between the corresponding network and the S-GW, the S-GW stops paging to the UE by transmitting a stop paging message to other network (i.e., a network in which the UE is not camping on).

For example, when downlink data is received in a situation of ISR activated, the S-GW transmits DDN to both of the MME and the SGSN, and each of the MME and the SGSN transmits the paging message to the UE. In the case that the UE is camping on E-UTRAN, the UE transmits a Service Request to the MME as a paging response, and downlink data connection is setup between E-UTRAN and the S-GW. Later, the S-GW transmits a stop paging message to the SGSN, and the SGSN stops paging to the UE.

7. The S-GW transmits downlink data to the UE through RAT in which a Service Request procedure is perform.

Extended Idle Mode Discontinuous Reception (eDRX)

A UE and a core network may negotiate a use of eDRX. When the UE determines to request the eDRX, the UE includes an eDRX parameter information element in an attach request and/or TAU request message. The UE may also include a UE-specific DRX parameter for a regular idle mode DRX.

An MME determines whether to accept or reject the UE request for activating the eDRX.

In the case that the MME accepts the eDRX, based on an operator policy, the MME may provide a value of eDRX parameter which is different from a value requested by the UE. When the MME accepts the eDRX, the UE applies the eDRX based on the received eDRX parameter. In the case that SGSG/MME rejects the request of UE or the UE is unable to receive the eDRX parameter information element in an associated accept message, the UE applies regular idle mode DRX.

When the UE has a bearer for an urgent bearer service, the UE may not request for the eDRX.

In the case that the UE is still wants to use the eDRX, the UE is needed to include the eDRX parameter information element in each TAU message. When the UE moves from an MME to another MME, from an MME to an SGSN, and from an SGSN to an MME, the eDRX parameter is not transmitted as a new core node (CN node) from an old CN node as a part of Mobility Management (MM) context information.

The UE and the network may negotiate a use of the eDRX in order to reduce power consumption of the UE through non-access stratum (NAS) signaling, but mobile terminating data and/or network originated procedure is/are available to use within specific delay which is dependent upon a DRX cycle value.

An application that wants to use the eDRX is required to consider a mobile terminating service or a specific control of data forwarding, and particularly, the corresponding application is required to consider delay tolerance for the mobile terminating data.

A network terminating application may transmits mobile terminating data, SMS or device trigger, and is required to know that the eDRX is properly prepared.

In order to negotiate a use of the eDRX, the UE requests an eDRX parameter during the attach procedure and RAU/TAU procedure. The SGSN/MME may reject or accept the UE request for activating the eDRX.

When the SGSN/MME accepts the eDRX, based on an operator policy, the SGSN/MME may provide a value which is different the eDRX parameter requested by the UE. When the SGSN/MME accepts the use of the eDRX, the UE applies the eDRX based on the received eDRX parameter. In the case that the UE is unable to receive the eDRX parameter information element in an associated accept message, the UE applies regular idle mode DRX.

When the UE requests both of activations of the PSM (requesting an active time and P-TAU timer) and the eDRX (together with a specific eDRX cycle value), the SGSN/MME determines one of the followings.

1) The SGSN/MME activates the PSM only. That is, the SGSN/MME does not accept the request for the eDRX.

2) The SGSN/MME activates the eDRX only. That is, the SGSN/MME does not accept the request of the active time.

3) The SGSN/MME activates both of the PSM (i.e., provide the active time) and the eDRX (i.e., provides the eDRX parameter).

The active time, the P-TAU timer and/or the eDRX cycle value that are determined and provided to the UE among the three operations are dependent upon an implementation based on a local configuration and other information which is usable in the SGSN/MME. The selected method is used until the next Attach or RAU/TAU procedure is started (when a new method is determined). When both of the eDRX and the PSM are activated, the eDRX cycle is needed to be set in order to have a multiple paging occasion while the active timer operates.

In the case that the PSM active time provided by the UE is greater than the eDRX cycle value provided by the UE, the SGSN/MME may activate both of the PSM and the eDRX. Due to this, the UE may minimize power consumption during the active time (e.g., in the case that the active time is slightly longer than a general active time by a few minutes).

When the eDRX is activated, a network may control mobile terminated data by using high latency communication property. A technique for controlling mobile terminated SMS may be applied.

The UE may request a use of the eDRX cycle by including the eDRX parameter in the Attach request or the TAU request. When the UE has a PDN connection established for an urgent bearer service, the UE does not request a use of the eDRX cycle during the TAU procedure.

When accepting the Attach request or the TAU request, the network accepts the request for the use of the eDRX cycle by providing the eDRX parameter. The UE repeats the request for the use of the eDRX cycle in each TAU request. Only in the case that the network accepts the use of the eDRX cycle during the last successful Attach or TAU procedure, the UE may use the eDRX cycle.

Activation/Deactivation Control Method of ISR

As described above, a UE uses the eDRX, an S-GW transmits a DDN to an MME/SGSN. At this time, since the MME or the SGSN identifies that the UE is in the eDRX mode, the MME or the SGSN transmits a DDN reject message to the S-GW, and does not transmit paging to the UE.

However, in an ISR activated environment, a part of networks (MME or SGSN) does not support the eDRX, a problem may occur when mobile terminated (MT) call/data is transmitted to the UE as below. This will be described with reference to the drawing below.

FIGS. 10 and 11 are diagrams for describing a problem when using the eDRX mode in a situation that ISR is activated.

In FIGS. 10 and 11, it is assumed that an MME supports the eDRX, an SGSN does not support the eDRX, the ISR is activated, and a UE is in the eDRX mode currently.

1. An S-GW receives downlink data.

2. The S-GW transmits a downlink data notification (DDN) to the MME and the SGSN.

3. The MME rejects the DDN together with duration information for storing downlink data to the S-GW. That is, the MME transmits a DDN acknowledge message including a rejection cause and duration information for storing downlink data to the S-GW.

Accordingly, the MME does not transmit paging to the UE.

4-5. On the other hand, since the SGSN does not know that the UE is in the eDRX mode currently, the SGSN transmits paging to the UE.

In other words, in the eDRX mode, since the MME knows that the UE is in the eDRX mode, the MME transmits a DDN reject message (together with the duration information for storing downlink data) to the S-GW, but the SGSN transmits paging to the UE as previously.

At this time, the SGSN may transmit paging continuously until the SGSN receives a stop paging message or acknowledges that the UE is unreachable due to paging failure during a predetermined period.

That is, since the SGSN is unable to know that the UE is in the eDRX mode, the SGSN transmits paging to the UE during a predetermined time or as much as a limited count.

However, only in the case that the UE responds to paging through a Service Request procedure, the S-GW may transmit the stop paging to the SGSN. Therefore, paging to the UE of the SGSN is useless and causes resource waste.

The UE may fail to respond to paging to the SGSN, and fail to receive MT call/data.

In other words, the UE that operates in the eDRX may receive paging and respond only on specific frame timing during the eDRX cycle. However, the UE and the SGSN misunderstand the specific frame timing for receiving paging reception (i.e., synchronization is not tuned), the probability that fails to receive paging is high.

Accordingly, in such a situation, paging from the SGSN to the UE is useless operation, and due to this, unnecessary network resource waste is resulted. In addition, paging reception failure occurs due to the discrepancy of paging reception timings of the UE and the SGSN, and consequently, MT call/data reception failure occurs.

Even in the reverse case (i.e., in the case that the SGSN supports the eDRX but the MME does not support the eDRX), the same problem occurs similarly. That is, paging from the MME to the UE is useless operation, and due to this, unnecessary network resource waste is caused.

In order to solve such a problem, the present invention proposes a method for processing a UE or a network in order to prevent unnecessary resource waste when a part of networks does not support the eDRX in an environment in which ISR is activated.

A-1) According to an embodiment of the present invention, in an ISR activation procedure (refer to FIG. 8 above), network nodes (e.g., MME and SGSN) check mutual eDRX capability (i.e., whether to support the eDRX), and finally, it may be determined whether to activate/deactivate ISR of a UE.

FIG. 12 is a diagram illustrating a method for controlling ISR activation/deactivation according to an embodiment of the present invention.

Referring to FIG. 12, a UE starts an Attach procedure by transmitting an Attach Request message to an MME (step, S1201).

Here, the Attach Request message may include an old GUTI (i.e., GUTI mapped to real GUTI or P-TMSI).

The MME may perform an interaction with an HSS (step, S1202), and the MME may be registered in the HSS (step, S1203).

In response to the Attach Request message, the MME transmits an Attach Accept message to the UE (step, S1204).

Here, the Attach Accept message may include a GUTI.

The Attach Accept message does not indicate ISR activation, and accordingly, the UE sets TIN as the GUTI (step, S1205).

Steps S1201 to S1205 above correspond to a general Attach procedure in which any special things for an ISR are not exist except that any potential old ISR state is also deactivated.

In FIG. 12, it is assumed that the UE is in a state of being attached to E-UTRAN. In addition, it is assumed that both of the MME and an SGSN support the ISR, and the MME supports the eDRX, but the SGSN does not support the eDRX.

The UE starts the RAU procedure (step, S1206).

At this time, the UE may transmit an RAU Request including an eDRX parameter to the SGSN.

Here, like in step S1205 above, TIN is set as "GUTI", the RAU Request may include "P-TMSI" which is mapped to the GUTI.

The SGSN indicates that the SGSN itself is capable of supporting ISR without an indication for supporting the eDRX while requesting a UE context to the MME (step, S1207).

That is, since the SGSN does not support the eDRX, the SGSN does not indicate that the SGSN itself is capable of supporting the eDRX (i.e., no eDRX capability indication).

In other words, the SGSN transmits a UE Context Request message including an indication of not supporting the eDRX (i.e., no eDRX capability indication) and an indication of supporting the ISR (i.e., ISR capability indication) to the MME.

In response to the UE context, the MME indicates that the MME itself is not ISR capable but eDRX capable to the SGSN (step, S1208).

That is, in step S1107 above, since the SGSN does not indicate the eDRX capable to the MME and the MME knows that the SGSN does not support the eDRX, the MME indicates that the MME itself is not ISR capable but eDRX capable. In other words, since the SGSN does not support the eDRX, the MME indicates that the MME itself is not ISR capable although the MME itself support the ISR.

In other words, the MME transmits a UE Context Response including an indicating of not supporting the ISR (i.e., no ISR capability indication) and an indication of supporting the eDRX (i.e., eDRX capability indication) to the SGSN.

As another example, the MME may transmits a UE Context Response message including an indication of supporting the eDRX (i.e., eDRX capability indication) and an indicating of supporting the ISR (i.e., ISR capability indication) to the SGSN.

The SGSN acknowledges that the ISR is not activated to the MME (step, S1209).

That is, the SGSN transmits a UE Context Acknowledge including ISR no active indication to the MME.

In other words, since the SGSN receives that the MME does not support the ISR from the MME, the SGSN may acknowledge that the ISR is not activate to the MME.

Alternatively, the SGSN that does not support the eDRX may disregard the eDRX capability indication or the no eDRX capability indication, regardless of the ISR acknowledge indication from the MME, and acknowledge that the SGSN does not activate the ISR to the MME.

The MME may store an SGSN ID (step, S1210), and the SGSN may store an MME ID (step, S1211).

The SGSN may perform an interaction with the HSS (step, S1212), and the SGSN may be registered in the HSS (step, S1213).

The SGSN notifies that the RAU procedure is successful and the ISR is not activated to the UE (step, S1214).

That is, the SGSN transmits an RAU Accept message including No ISR activation indication to the UE.

At this time, since the SGSN does not support the eDRX, the RAU Accept message does not include the eDRX parameter for supporting the eDRX.

Since No ISR activation is indicated in the RAU Accept message, the UE does not activate the ISR (step, S1215).

At this time, the UE may set TIN as "P-TMIS", not "RAT-related TMSI".

In the case that the SGSN transmits a UE Context Request message including eDRX capability indication to the MME in step S1207, the MME may identify that the SGSN supports the eDRX. In this case, since the MME also supports the eDRX, in step S1214, ISR activation with eDRX support may be performed. That is, the SGSN may transmit the parameter for eDRX mode and the ISR activation indication with being included in the RAU Accept message to the UE.

Meanwhile, FIG. 12 exemplifies the case that the UE moves to the coverage of UTRAN in a situation that the UE is attached to E-UTRAN, and performs the RAU procedure. However, on the contrary, it may be identically applied to the case that the UE moves to the coverage of E-UTRAN in a situation that the UE is attached to UTRAN, and performs the TAU procedure. That is, in the case that the MME is substituted by the SGSN and the SGSN is substituted by the MME in FIG. 12, the ISR control method may be performed as below.

Hereinafter, it is assumed that the UE is attached to UTRAN through the procedure as in step S1201 to step S1205 above. In addition, it is assumed that both of the MME and the SGSN support the ISR, and the MME supports the eDRX, but the SGSN does not support the eDRX.

The UE starts the TAU procedure (step, S1206).

At this time, the UE may transmits a TAU Request including an eDRX parameter to the MME.

While the MME requests a UE context to the SGSN, the MME indicates that the MME itself is ISR capable and eDRX capable (step, S1207).

That is, the MME transmits a UE Context Request message including an indication of supporting the ISR (i.e., ISR capability indication) and an indication of supporting the eDRX (i.e., eDRX capability indication) to the SGSN.

In response to the UE context, the SGSN indicates that the SGSN itself is capable of support the ISR without an indication for supporting the eDRX (step, S1208).

That is, since the SGSN does not support the eDRX, the SGSN indicates that the SGSN itself is not eDRX capable (i.e., no eDRX capability indication).

In other words, the SGSN transmits a UE Context Response message including an indication of not supporting the eDRX (i.e., no eDRX capability indication) and an indication of supporting the ISR (i.e., ISR capability indication) to the MME.

In step S1208, since the SGSN does not indicate that the SGSN itself is eDRX capable to the MME, the MME knows that the SGSN does not support the eDRX. Accordingly, the MME acknowledges that the ISR is not activated to the SGSN (step, S1209).

That is, the MME transmits a UE Context Acknowledge message including ISR no active indication to the SGSN.

The SGSN may store an MME ID (step, S1210), and the MME may store an SGSN ID (step, S1211).

The MME may perform an interaction with the HSS (step, S1212), and the MME may be registered in the HSS (step, S1213).

The MME notifies that the TAU procedure is successful and the ISR is not activated to the UE (step, S1214).

That is, the MME transmits a TAU Accept message including No ISR activation indication to the UE.

At this time, since the MME supports the eDRX, the TAU Accept message may include the parameter for the eDRX.

Since No ISR activation is indicated in the TAU Accept message, the UE does not activate the ISR (step, S1215).

At this time, the UE may set TIN as "GUTI", not "RAT-related TMSI".

At this time, in the case that the parameter for supporting the eDRX is included in the TAU Accept message, the UE may activate the eDRX.

In the case that the SGSN transmits a UE Context Request message including eDRX capability indication to the MME in step S1208, the MME may identify that the SGSN supports the eDRX. In this case, since the MME also supports the eDRX, in step S1214, ISR activation with eDRX support may be performed. That is, the MME may transmit the parameter for eDRX mode and the ISR activation indication with being included in the TAU Accept message to the UE.

Meanwhile, in the embodiment exemplified in FIG. 12, it is assumed the case that the MME supports the eDRX and the SGSN supports the eDRX. However, on the contrary, it may be identically applied to the case that the MME does not support the eDRX and the SGSN supports the eDRX.

A-2) According to another embodiment of the present invention, in an ISR activation procedure (refer to FIG. 8 above), network nodes (e.g., MME and SGSN) check mutual eDRX capability (i.e., whether to support the eDRX), and finally, it may be determined whether to activate/deactivate ISR of a UE.

FIG. 13 is a diagram illustrating a method for controlling ISR activation/deactivation according to an embodiment of the present invention.

Referring to FIG. 13, a UE starts an Attach procedure by transmitting an Attach Request message to an MME (step, S1301).

Here, the Attach Request message may include an old GUTI (i.e., GUTI mapped to real GUTI or P-TMSI).

The MME may perform an interaction with an HSS (step, S1302), and the MME may be registered in the HSS (step, S1303).

In response to the Attach Request message, the MME transmits an Attach Accept message to the UE (step, S1304).

Here, the Attach Accept message may include a GUTI.

The Attach Accept message does not indicate ISR activation, and accordingly, the UE sets TIN as the GUTI (step, S1305).

Steps S1301 to S1305 above correspond to a general Attach procedure in which any special things for an ISR are not exist except that any potential old ISR state is also deactivated.

In FIG. 13, it is assumed that the UE is in a state of being attached to E-UTRAN. In addition, it is assumed that both of the MME and an SGSN support the ISR, and the MME supports the eDRX, but the SGSN does not support the eDRX.

The UE starts the RAU procedure (step, S1306).

At this time, the UE may transmit an RAU Request including an eDRX parameter to the SGSN.

Here, like in step S1305 above, TIN is set as "GUTI", the RAU Request may include "P-TMSI" which is mapped to the GUTI.

The SGSN indicates that the SGSN itself is capable of supporting ISR while requesting a UE context to the MME (step, S1307).

That is, the SGSN transmits a UE Context Request message including an indication of supporting the ISR (i.e., ISR capability indication) to the MME.

In response to the UE context, the MME indicates that the MME itself is not ISR capable to the SGSN (step, S1308).

That is, the MME transmits a UE Context Response including an indicating of supporting the ISR (i.e., ISR capability indication) to the SGSN.

The SGSN acknowledges that the ISR is activated to the MME (step, S1309).

That is, the SGSN transmits a UE Context Acknowledge including an indication that the ISR is activated (ISR activated) to the MME.

The MME may store an SGSN ID (step, S1310), and the SGSN may store an MME ID (step, S1311).

The SGSN may perform an interaction with the HSS (step, S1312), and the SGSN may be registered in the HSS (step, S1313).

The SGSN notifies that the RAU procedure is successful and the ISR is activated without the eDRX parameter to support the eDRX to the UE (step, S1314).

That is, the SGSN transmits an RAU Accept message including ISR activation indication to the UE without the eDRX parameter.

Since the ISR is activated by the RAU Accept message but the eDRX parameter is not existed in the RAU Accept, the UE may know that the current SGSN does not support the eDRX. Accordingly, the UE deactivates the ISR and the eDRX locally (step, S1315).

At this time, the UE may set TIN as "P-TMIS", not "RAT-related TMSI".

In the case that the SGSN provides the eDRX parameter for supporting the eDRX to the UE, in step S1314, the UE may identify that the SGSN supports the eDRX. Accordingly, in step S1315, ISR activation with eDRX support may be performed.

Meanwhile, FIG. 13 exemplifies the case that the UE moves to the coverage of UTRAN in a situation that the UE is attached to E-UTRAN, and performs the RAU procedure. However, on the contrary, it may be identically applied to the case that the UE moves to the coverage of E-UTRAN in a situation that the UE is attached to UTRAN, and performs the TAU procedure. That is, in the case that the MME is substituted by the SGSN and the SGSN is substituted by the MME in FIG. 13, the ISR control method may be performed as below.

Hereinafter, it is assumed that the UE is attached to UTRAN through the procedure as in step S1301 to step S1305 above. In addition, it is assumed that both of the MME and the SGSN support the ISR, and the MME supports the eDRX, but the SGSN does not support the eDRX.

The UE starts the TAU procedure (step, S1306).

At this time, the UE may transmits a TAU Request including an eDRX parameter to the MME.

While the MME requests a UE context to the SGSN, the MME indicates that the MME itself is ISR capable (step, S1307).

That is, the MME transmits a UE Context Request message including an indication of supporting the ISR (i.e., ISR capability indication) to the SGSN.

In response to the UE context, the SGSN indicates that the SGSN itself is capable of support the ISR (step, S1308).

That is, the SGSN transmits a UE Context Response message including an indication of supporting the ISR (i.e., ISR capability indication) to the SGSN.

The MME acknowledges that the ISR is activated to the SGSN (step, S1309).

That is, the MME transmits a UE Context Acknowledge message including an indication that the ISR is activated to the SGSN.

The SGSN may store an SGSN ID (step, S1310), and the MME may store an MME ID (step, S1311).

The MME may perform an interaction with the HSS (step, S1312), and the MME may be registered in the HSS (step, S1313).

The MME notifies that the TAU procedure is successful and the ISR is activated with the eDRX parameter to the UE (step, S1314).

That is, the MME transmits a TAU Accept message including ISR activation indication with the eDRX parameter to the UE.

The UE may know that the ISR is activated, but the old SGSN does not support the eDRX, and the current MME supports the eDRX. For example, the UE may determine whether an eNB (i.e., UTRAN) supports the eDRX according to whether there is information of hyper frame (e.g., Hyper Frame Number (HFN) or information of Hyper-System Frame Number (H-SFN)) in the System Information Block (SIB) which is received from the eNB (i.e., UTRAN) attached previously.

Accordingly, the UE deactivates the ISR locally (step, S1315).

At this time, the UE may set TIN as "GUTI", not "RAT-related TMSI".

On the contrary, since the eDRX parameter for supporting the eDRX is included in the TAU Accept, the UE may activate the eDRX.

In the case that the SGSN provides the parameter for supporting the eDRX to the UE, the UE may know that the SGSN supports the eDRX. Accordingly, in step S1315, ISR activation with eDRX support may be performed.

Meanwhile, in the embodiment exemplified in FIG. 13, it is assumed the case that the MME supports the eDRX and the SGSN supports the eDRX. However, on the contrary, it may be identically applied to the case that the MME does not support the eDRX and the SGSN supports the eDRX.

A-3) According to another embodiment of the present invention, in an ISR activation procedure (refer to FIG. 8 above), by checking the eDRX capability (i.e., whether to support the eDRX) of network nodes (e.g., MME and SGSN), finally, a UE may determine whether to activate/deactivate ISR locally.

FIG. 14 is a diagram illustrating a method for controlling ISR activation/deactivation according to an embodiment of the present invention.

Referring to FIG. 14, a UE starts an Attach procedure by transmitting an Attach Request message to an MME (step, S1401).

Here, the Attach Request message may include an old GUTI (i.e., GUTI mapped to real GUTI or P-TMSI).

The MME may perform an interaction with an HSS (step, S1402), and the MME may be registered in the HSS (step, S1403).

In response to the Attach Request message, the MME transmits an Attach Accept message to the UE (step, S1404).

Here, the Attach Accept message may include a GUTI.

The Attach Accept message does not indicate ISR activation, and accordingly, the UE sets TIN as the GUTI (step, S1405).

Steps S1301 to S1405 above correspond to a general Attach procedure in which any special things for an ISR are not exist except that any potential old ISR state is also deactivated.

In FIG. 14, it is assumed that the UE is in a state of being attached to E-UTRAN. In addition, it is assumed that both of the MME and an SGSN support the ISR, and the MME supports the eDRX, but the SGSN does not support the eDRX.

In addition, it is assumed that the UE identifies whether the eDRX is supported in a corresponding RAT when the UE camps on the RAT. That is, when the UE camps on the RAT, the UE may know whether the corresponding RAT supports the eDRX mode through SIB received from the corresponding RAT (i.e., eNB). That is, according to whether there is information (e.g., information of HFN or H-SFN) of the hyper frame in SIB, the UE may determine whether the corresponding RAT supports the eDRX mode.

Since it is assumed that the SGSN does not support the eDRX in FIG. 14, the information (e.g., information of HFN or H-SFN) of hyper frame in SIB received from an eNB (i.e., UTRAN) is not existed, and through this, the UE may know that UTRAN does not support the eDRX.

The UE starts the RAU procedure (step, S1406).

At this time, a RAU Request may not include the eDRX parameter, and include an indication that the UE does not support the ISR (i.e., no ISR support indication). Alternatively, the RAU Request does not include the eDRX parameter, and TIN may be set as "P-TMSI".

The SGSN indicates that the SGSN itself is not capable of supporting ISR while requesting a UE context to the MME (step, S1407).

That is, the SGSN transmits a UE Context Request message including an indication of not supporting the ISR (i.e., no ISR capability indication) to the MME.

In response to the UE context, the MME indicates that the MME itself is not ISR capable to the SGSN (step, S1408).

That is, the MME transmits a UE Context Response including an indicating of not supporting the ISR (i.e., no ISR capability indication) to the SGSN.

The SGSN acknowledges that the ISR is not activated to the MME (step, S1409).

That is, the SGSN transmits a UE Context Acknowledge including an indication that the ISR is not activated (ISR not activated) to the MME.

The MME may store an SGSN ID (step, S1410), and the SGSN may store an MME ID (step, S1411).

The SGSN may perform an interaction with the HSS (step, S1412), and the SGSN may be registered in the HSS (step, S1413).

The SGSN notifies that the RAU procedure is successful and the ISR is not activated without the eDRX parameter for supporting the eDRX to the UE (step, S1414).

That is, without the eDRX parameter, the SGSN transmits an RAU Accept message including No ISR activation indication to the UE.

Since No ISR activation is indicated in the RAU Accept message, the UE does not activate the ISR and the eDRX (step, S1415).

At this time, the UE may set TIN as "P-TMIS", not "RAT-related TMSI".

Meanwhile, FIG. 14 exemplifies the case that the UE moves to the coverage of UTRAN in a situation that the UE is attached to E-UTRAN, and performs the RAU procedure. However, on the contrary, it may be identically applied to the case that the UE moves to the coverage of E-UTRAN in a situation that the UE is attached to UTRAN, and performs the TAU procedure. That is, in the case that the MME is substituted by the SGSN and the SGSN is substituted by the MME in FIG. 14, the ISR control method may be performed as below.

Hereinafter, it is assumed that the UE is attached to UTRAN through the procedure as in step S1401 to step S1405 above. In addition, it is assumed that both of the MME and the SGSN support the ISR, and the MME supports the eDRX, but the SGSN does not support the eDRX.

The UE starts the TAU procedure (step, S1406).

At this time, a TAU Request does not include an eDRX parameter, and include an indication indicating that the UE does not support the ISR (i.e., no ISR support indication). Alternatively, the TAU Request does not include the eDRX parameter and TIN may be set as "GUTI"

While the MME requests a UE context to the SGSN, the MME indicates that the MME itself is not ISR capable (step, S1407).

That is, the MME transmits a UE Context Request message including an indication of not supporting the ISR (i.e., no ISR capability indication) to the SGSN.

In response to the UE context, the SGSN indicates that the SGSN itself is not capable of support the ISR (step, S1408).

That is, the SGSN transmits a UE Context Response message including an indication of not supporting the ISR (i.e., no ISR capability indication) to the MME.

The MME acknowledges that the ISR is not activated to the SGSN (step, S1409).

That is, the MME transmits a UE Context Acknowledge message including an indication that the ISR is not activated (ISR not activated) to the SGSN.

The SGSN may store an MME ID (step, S1410), and the MME may store an SGSN ID (step, S1411).

The MME may perform an interaction with the HSS (step, S1412), and the MME may be registered in the HSS (step, S1413).

The MME notifies that the TAU procedure is successful and the ISR is not activated together with the eDRX parameter for supporting the eDRX to the UE (step, S1414).

That is, the MME transmits a TAU Accept message including No ISR activation indication together with the eDRX parameter to the UE.

Since No ISR activation is indicated in the TAU Accept message, the UE does not activate the ISR (step, S1415).

At this time, the UE may set TIN as "GUTI", not "RAT-related TMSI".

On the contrary, since the eDRX parameter for supporting the eDRX is included in the TAU Accept, the UE may activate the eDRX.

Meanwhile, in the embodiment exemplified in FIG. 14, it is assumed the case that the MME supports the eDRX and the SGSN supports the eDRX. However, on the contrary, it may be identically applied to the case that the MME does not support the eDRX and the SGSN supports the eDRX.

The proposed method according to embodiment A-1), the proposed method according to embodiment A-2) and the proposed method according to embodiment A-3) may be independently applied with each other, but one or more proposed methods may be combined and applied.

FIG. 15 is a diagram illustrating a method for controlling ISR activation/deactivation according to an embodiment of the present invention.

FIG. 15 exemplifies a Location Area Update (LAU) procedure performed by a UE according to a movement or the reverse movement of the coverage of E-UTRAN in a situation in which the UE is attached to GERAN/UTRAN.

In the present disclosure, the Location Area Update (LAU) may include a Routing Area Update (RAU) or a Tracking Area Update (TAU).

Here, a first network node means a node that a UE performs the LAU procedure currently, and a second network node (i.e., old MME or SGSN) means a node that the UE is previously registered.

That is, in a situation in which the UE is attached to GERAN/UTRAN and moves to the coverage of E-UTRAN, the first network node may correspond to an MME and the second network node may correspond to SGSN, and the LAU procedure may correspond to the TAU. On the contrary, in a situation in which the UE is attached to E-UTRAN and moves to the coverage of GERAN/UTRAN, the first network node may correspond to an SGSN and the second network node may correspond to MME, and the LAU procedure may correspond to the RAU.

Referring to FIG. 15, the first network node receives a LAU Request message (i.e., RAU Request message or TAU Request message) from the UE (step, S1501).

At this time, the LAU Request message may include a parameter for supporting the eDRX.

The first network node transmits a Context Request message to the second network node (step, S1502).

That is, in the case that the types of the first network and the second network are different, the first network may transmits the Context Request message to the second network node in order to obtain user information of the UE.

At this time, in the case that the first network node supports the eDRX mode, the Context Request message may include a first eDRX capability indication indicating that the first network node supports the eDRX.

In addition, the Context Request message may further include a first ISR capability indication indicating whether the first network node supports the ISR.

The first network node receives a Context Response message from the second network node in response to the Context Request message (step, S1503).

At this time, in the case that the second network node supports the eDRX mode, the Context Response message may include a second eDRX capability indication indicating that the second network node supports the eDRX.

In addition, the Context Response message may further include a second ISR capability indication indicating whether the second network node supports the ISR.

The first network node may determine to activate the ISR mode of the UE based on the first eDRX capability indication and the second eDRX capability indication (step, S1504).

That is, in the case that at least one of the first network node and the second network node does not support the eDRX mode (i.e., in the case that at least one of the first eDRX capability indication and the second eDRX capability indication is not existed), the ISR of the UE may not be activated (i.e., deactivated).

At this time, the first network node may determine whether to activate the ISR mode of the UE regardless of the first ISR capability indication and the second ISR capability indication. That is, even in the case that both of the first network node and the second network node support the ISR, the first network node may not activate the ISR of the UE based on the first eDRX capability indication and the second eDRX capability indication.

Later, when the ISR of the UE is not activated, the first network node may transmit a Context Acknowledge message including the ISR deactivation indication indicating that the ISR of the UE is deactivated to the second network node. Here, in the case that the ISR Activated indication indicating that the ISR of the UE is activated is not included in the Context Acknowledge message, the second network node may identify that it is ISR deactivation indication.

Later, when the ISR of the UE is not activated, the first network node may transmit a LAU Accept message (i.e., RAU Request message or TAU Request message) including the ISR deactivation indication indicating that the ISR of the UE is deactivated to the UE in response to the LAU Request message. Here, in the case that the ISR activation indication indicating that the ISR of the UE is activated is not included, the UE may identify that it is the ISR deactivation indication.

FIG. 16 is a diagram illustrating a method for controlling ISR activation/deactivation according to an embodiment of the present invention.

FIG. 16 exemplifies a LAU procedure performed by a UE according to a movement or the reverse movement of the coverage of E-UTRAN in a situation in which the UE is attached to GERAN/UTRAN.

In a situation in which the UE is attached to GERAN/UTRAN and moves to the coverage of E-UTRAN, a network node may correspond to an MME and the LAU procedure may correspond to the TAU. On the contrary, in a situation in which the UE is attached to E-UTRAN and moves to the coverage of GERAN/UTRAN, the network node may correspond to an SGSN and the LAU procedure may correspond to the RAU.

Referring to FIG. 16, the UE determines whether an eNB on which the UE itself is camping supports the eDRX mode (step, S1601).

With respect to the fact whether the eNB supports the eDRX mode, the UE may determine whether the eNB supports the eDRX mode according to whether information (e.g., HFN or H-SFN) of a hyper frame in an SIB transmitted from the corresponding eNB. That is, in the case that information of a hyper frame is included in the SIB transmitted from the eNB, it may be determined that the corresponding eNB supports the eDRX mode, and in the case that that information of a hyper frame is not included in the SIB, it may be determined that the corresponding eNB does not support the eDRX mode.

When a network does not support the eDRX mode, by transmitting a LAU Request message (i.e., RAU Request message or TAU Request message) including an indication that the UE does not support the ISR (no ISR supported indication) to the network node (i.e., MME or SGSN), the UE starts the LAU procedure (step, S1602).

Later, the UE may receive a LAU Accept message (i.e., RAU Request message or TAU Request message) including the ISR deactivation indication indicating that the ISR of the UE is deactivated from the network node in response to the LAU Request message. Here, in the case that the ISR activation indication indicating that the ISR of the UE is activated is not included, the UE may identify that it is the ISR deactivation indication.

Meanwhile, in the embodiments A-1), A-2) and A-3) described above, before the ISR of the UE is activated, the embodiment of determining activation/deactivation of the ISR of the UE is described based on whether to support the eDRX of the network.

Hereinafter, in an environment in which the ISR is activated, in the case that nodes of a part of networks do not support the eDRX, the present invention proposes a UE for preventing unnecessary resource waste and a method for processing network.

B-1) According to an embodiment of the present invention, in the case that the eDRX mode operates in a situation in which the ISR is activated, a paging transmission may be handled.

FIG. 17 is a diagram illustrating a method for paging control according to an embodiment of the present invention.

In FIG. 17, it is assumed that the ISR is activated in a network (i.e., an MME, an SGSN and an S-GW) and a UE is in the eDRX mode currently. In addition, in such a situation, it is assumed that the UE attaches to the TA or the RA which is not belonged to TAI or RAI, and a part of networks (MME or SGSN) does not support the eDRX. FIG. 16 illustrates the case that the SGSN does not support the eDRX.

When the S-GW receives downlink data (step, S1701), the S-GW transmits a Downlink Data Notification (DDN) message to the MME and the SGSN (steps, S1702 and S1703).

In the case that the MME and the SGSN receive the DDN message from the S-GW, a network that supports the eDRX transmits a DDN Reject message (e.g., a DDN Acknowledge message including a Reject cause or a new DDN Reject message) to the S-GW, but a network that does not support the eDRX transmits paging to the UE.

In other words, the network (MME or SGSN) that supports the eDRX may identify that the UE is in the eDRX state currently. Accordingly, a performance of the paging procedure may be stopped. However, the network (MME or SGSN) that does not support the eDRX may not identify that the UE is in the eDRX state currently. Accordingly, a performance of the paging procedure may be progressed without any change.

In FIG. 17, the case is shown that the MME supports the eDRX but the SGSN does not support the eDRX, and accordingly, the MME transmits a DDN Reject message to the S-GW (step, S1704).

For example, the MME may transmit a DDN Acknowledge message including a Reject cause to the S-GW. At this time, the Reject cause included in the DDN Acknowledge message may be a Reject cause which is defined as Unable to page UE or Unable to page UE due to eDRX mode.

At this time, the DDN Reject message may include downlink data storing duration information.

The S-GW that receives the DDN Reject message including downlink data storing duration information from the MME stores (buffering) the downlink data and suspends (pending) a DDN transmission.

On the other hand, after receiving the DDN message from the S-GW, the SGSN transmits paging to the UE through RNC/BSC (steps, S1705 and S1706).

In a situation in which the ISR is activated, in the case that the S-GW receives the DDN Reject message (e.g., the DDN Acknowledge message including a Rejection cause or a new DDN Reject message) from either one of the MME or the SGSN, the S-GW transmits a Stop Paging Indication message to other network that fails to receive the DDN Reject message (e.g., the DDN Acknowledge message including a Rejection cause or a new DDN Reject message). That is, the S-GW regards that other network does not support the eDRX.

Alternatively, after the S-GW waits for a predetermined time (e.g., after a timer operates, i.e., after a timer operation expires), the S-GW may also transmit the Stop Paging Indication message to other network that fails to receive the DDN Reject message (e.g., the DDN Acknowledge message including a Rejection cause or a new DDN Reject message). This is designed for the UE able to receive paging of the SGSN in the case that the UE moves to RA area of the SGSN from TA area of the MME during processing the procedure of FIG. 17.

In the case of FIG. 17, the S-GW transmits the Stop Paging Indication message to the SGSN (step, S1707). At this time, the S-GW may add an error cause (or rejection cause), for example, a cause value like an error cause due to an eDRX resource in the MME to the Stop Paging Indication message.

The network node (i.e., SGSN) that receives the Stop Paging Indication message from the S-GW stops the paging transmission (steps, S1708 and S1709).

In the case that the cause value like an error cause due to an eDRX resource in the MME is included in the Stop Paging Indication message, the SGSN operates a specific timer. Later, only the time duration during the specific timer operates, the SGSN transmits paging to the UE, and after the operation of the specific timer is completed, the SGSN may stop the paging transmission. This is also designed for the UE able to receive paging of the SGSN in the case that the UE moves to RA area of the SGSN from TA area of the MME during processing the procedure of FIG. 17.

That is, later, both of the MME and SGSN stop the paging transmission. This means that the MT service (downlink data service) is suspended.

The MME/SGSN that receive the Stop Paging Indication message including a cause value such as an error cause due to the eDRX support in the MME or the SGSN may stop the paging transmission during a predetermined time duration (i.e., may operate a predetermined timer, and stop the paging transmission after the timer expires).

Later, the UE may identify whether the network to which the UE itself is attached supports the eDRX mode through hyper frame information (e.g., information of HFN or H-SFN) of the SIB information provided from a BS (eNodeB or NodeB) on which the UE is currently camping.

This is because a new hyper frame is defined to support the eDRX. More particularly, when the UE applies the eDRX, the UE is reachable by paging in a specific Paging Hyperframe (PH). The PH means a specific set of Hyper-System Frame Number (H-SFN) values, and the PH may be calculated by using an extended idle mode DRX cycle and a UE-specific identifier (e.g., IMSI). The H-SFN frame structure is defined as a highest value of the SFN used for a general idle mode DRX. That is, one Hyper-frame includes 1024 radio frames (i.e., 10.24 seconds). Accordingly, when the SFN is wrap around, the H-SFN increases by 1.

Accordingly, in the case that the BS (eNodeB or NodeB) on which the UE is currently camping does not support the eDRX and the UE wakes up on specific frame timing in an eDRX cycle and identifies it, the UE deactivates the eDRX locally. That is, the UE releases the eDRX mode operation.

Later, process a) or process b) may be progressed as below.

a) Further, the UE may perform the TAU or RAU procedure. At this time, during the TAU or RAU procedure, the MME or the SGSN may transmit information/indication indicating that the UE is not in the eDRX mode currently. At this time, for example, a Create Session Request message, a Modify Bearer Request message, a Modify Access Bearers Request message or a new message may be used. The S-GW may restart the DDN transmission which was suspended to the MME and the SGSN.

The MME and the SGSN that receive the DDN from the S-GW perform the paging transmission again, and when the UE receives paging, may perform a Service Request procedure for a paging response.

Finally, after the Service Request procedure, the S-GW may transmit a paging stop message to the MME and the SGSN. In addition, the S-GW transmits downlink data to the corresponding network (network to which the paging response is transmitted), and accordingly, the UE may receive the downlink data (i.e., MT call/data reception).

b) Alternatively, the UE may perform the TAU or RAU procedure with the ISR deactivation locally. That is, the UE may set TIN as "P-TMSI" (in the case that the UE is camping on UTRAN) or "GUTI" (in the case that the UE is camping on E-UTRAN).

For example, the TAU Request or the RAU Request may include an indication that the UE does not support the ISR (i.e., no ISR support indication).

During the TAU or RAU procedure, the MME or the SGSN may transmit information/indication indicating that the UE is not in the eDRX mode currently and information/indication that the ISR is not activated (ISR not activated information/indication) to the S-GW. At this time, for example, a Create Session Request message, a Modify Bearer Request message, a Modify Access Bearers Request message or a new message may be used. The S-GW may restart the DDN transmission which was suspended to the MME only (in the case of the TAU) or to the SGSN only (in the case of the RAU).

The MME and the SGSN that receive the DDN from the S-GW perform the paging transmission again, and when the UE receives paging, may perform a Service Request procedure for a paging response.

Finally, after the Service Request procedure, the S-GW may transmit a paging stop message to the MME and the SGSN. In addition, the S-GW transmits downlink data to the corresponding network (network to which the paging response is transmitted), and accordingly, the UE may receive the downlink data (i.e., MT call/data reception).

B-2) According to another embodiment of the present invention, in the case that the eDRX mode operates in a situation in which the ISR is activated, a paging transmission may be handled.

FIG. 18 is a diagram illustrating a method for paging control according to an embodiment of the present invention.

In FIG. 18, it is assumed that the ISR is activated in a network (i.e., an MME, an SGSN and an S-GW) and a UE is in the eDRX mode currently. In addition, in a state in which the ISR is activated, it is assumed that the UE attaches to the TA or the RA which is not belonged to TAI or RAI, and a part of networks (MME or SGSN) does not support the eDRX. FIG. 17 illustrates the case that the SGSN does not support the eDRX.

When the S-GW receives downlink data (step, S1801), the S-GW transmits a Downlink Data Notification (DDN) message to the MME and the SGSN (steps, S1802 and S1803).

In the case that the MME and the SGSN receive the DDN message from the S-GW, a network that supports the eDRX transmits a DDN Reject message (e.g., a DDN Acknowledge message including a Reject cause or a new DDN Reject message) to the S-GW, but a network that does not support the eDRX transmits paging to the UE.

In other words, the network (MME or SGSN) that supports the eDRX may identify that the UE is in the eDRX state currently. Accordingly, a performance of the paging procedure may be stopped. However, the network (MME or SGSN) that does not support the eDRX may not identify that the UE is in the eDRX state currently. Accordingly, a performance of the paging procedure may be progressed without any change.

In FIG. 18, the case is shown that the MME supports the eDRX but the SGSN does not support the eDRX, and accordingly, the MME transmits a DDN Reject message to the S-GW (step, S1804).

For example, the MME may transmit a DDN Acknowledge message including a Reject cause to the S-GW. At this time, the Reject cause included in the DDN Acknowledge message may be a Reject cause which is defined as Unable to page UE or Unable to page UE due to eDRX mode.

At this time, the DDN Reject message may include downlink data storing duration information.

The S-GW that receives the DDN Reject message including downlink data storing duration information from the MME stores (buffering) the downlink data and suspends (pending) a DDN transmission.

On the other hand, after receiving the DDN message from the S-GW, the SGSN transmits paging to the UE through RNC/BSC (steps, S1805 and S1806).

At this time, in the case that the SGSN fails to receive a response from the UE, the SGSN transmits paging repeatedly.

However, in the ISR activated environment, in the case that the UE is camping on a network that does not support the eDRX, the SGSN is unable to receive a paging response, and consequently, a paging failure occurs.

That is, in the case that the SGSN fails to receive a response even after the paging repetition procedure, the SGSN transmits a DDN Reject message (Reject cause: paging failure) in order to inform the paging failure to the S-GW (step, S1807).

However, the S-GW does not discard the downlink data stored immediately after the paging failure occurs. The reason is because the network (MME or SGSN) that supports the eDRX provides downlink data storing duration information to the S-GW.

Later, the UE may identify whether the network to which the UE itself is attached supports the eDRX mode through hyper frame information (e.g., information of HFN or H-SFN) of the SIB information provided from a BS (eNodeB or NodeB) in which the UE is currently camping. Accordingly, in the case that the BS (eNodeB or NodeB) on which the UE is currently camping does not support the eDRX and the UE wakes up on specific frame timing in an eDRX cycle and identifies it, the UE deactivates the eDRX locally. That is, the UE releases the eDRX mode operation.

Later, process a) or process b) may be progressed as below.

a) Further, the UE may perform the TAU or RAU procedure. At this time, during the TAU or RAU procedure, the MME or the SGSN may transmit information/indication indicating that the UE is not in the eDRX mode currently. At this time, for example, a Create Session Request message, a Modify Bearer Request message, a Modify Access Bearers Request message or a new message may be used. The S-GW may restart the DDN transmission which was suspended to the MME and the SGSN.

The MME and the SGSN that receive the DDN from the S-GW perform the paging transmission again, and when the UE receives paging, may perform a Service Request procedure for a paging response.

Finally, after the Service Request procedure, the S-GW may transmit a paging stop message to the MME and the SGSN. In addition, the S-GW transmits downlink data to the corresponding network (network to which the paging response is transmitted), and accordingly, the UE may receive the downlink data (i.e., MT call/data reception).

b) Alternatively, the UE may perform the TAU or RAU procedure with the ISR deactivation locally. That is, the UE may set TIN as "P-TMSI" (in the case that the UE is camping on UTRAN) or "GUTI" (in the case that the UE is camping on E-UTRAN).

For example, the TAU Request or the RAU Request may include an indication that the UE does not support the ISR (i.e., no ISR support indication).

During the TAU or RAU procedure, the MME or the SGSN may transmit information/indication indicating that the UE is not in the eDRX mode currently and information/indication that the ISR is not activated (ISR not activated information/indication) to the S-GW. At this time, for example, a Create Session Request message, a Modify Bearer Request message, a Modify Access Bearers Request message or a new message may be used. The S-GW may restart the DDN transmission which was suspended to the MME only (in the case of the TAU) or to the SGSN only (in the case of the RAU).

The MME and the SGSN that receive the DDN from the S-GW perform the paging transmission again, and when the UE receives paging, may perform a Service Request procedure for a paging response.

Finally, after the Service Request procedure, the S-GW may transmit a paging stop message to the MME and the SGSN. In addition, the S-GW transmits downlink data to the corresponding network (network to which the paging response is transmitted), and accordingly, the UE may receive the downlink data (i.e., MT call/data reception).

B-3) According to another embodiment of the present invention, in the case that it operates in the eDRX mode in a situation in which the ISR is activated, the ISR may be deactivated.

FIG. 19 is a diagram illustrating a method for ISR activation/deactivation control according to embodiment of the present invention.

In FIG. 19, it is assumed that the ISR is activated in a network (i.e., an MME, an SGSN and an S-GW). In addition, it is assumed that the MME supports the eDRX and the SGSN does not support the eDRX. Further, it is illustrated that the UE is camping on E-UTRAN.

Referring to FIG. 18, in the case that a UE wants to operate in the eDRX, the UE transmits a TAU Request message to the MME (step, S1901).

At this time, the TAU Request message includes the eDRX parameter for the eDRX mode.

The MME may identify an eDRX request according to whether there is the eDRX parameter requested by the UE from the received TAU Request message.

In addition, the MME exchanges whether to support the eDRX (eDRX capable) with the old network node (SGSN in FIG. 19) through S3 interface message (e.g., the existing defined control message (Context Request/Context Response message) or new control message).

The MME transmits the eDRX capability supported indication with being included in the Context Request message (or new control message) to the SGSN (step, S1902).

That is, when the MME supports the eDRX capability, the eDRX capability supported indication may be set to 1, and when the MME does not support the eDRX capability, the eDRX capability supported indication may be set to 0.

The SGSN transmits the eDRX capability supported indication with being included in the Context Response message (or new control message) to the MME (step, S1903).

That is, when the SGSN supports the eDRX capability, the eDRX capability supported indication may be set to 1, and when the SGSN does not support the eDRX capability, the eDRX capability supported indication may be set to 0.

In the case that either one of the networks (i.e., MME or SGSN) is unable to support the eDRX (i.e., the eDRX capability supported indication is set to '0'), the MME transmits a Context Acknowledge message (or new control message) with an indication that the ISR is deactivated (ISR not activated indication/information) to the SGSN (step, S1904).

Here, in the case that an indication that the ISR is activated (ISR Activated indication) of the UE is not included in the Context Acknowledge message, the UE may identify that it is the ISR not activated indication.

By performing this, both of the MME and the SGSN are deactivated.

In the case that either one of the networks is unable to support the eDRX (i.e., the eDRX capability supported indication is set to '0'), the MME transmits a TAU Accept message with an indication that the ISR is deactivated (ISR not activated indication/information) to the UE (step, S1905).

At this time, the TAU Accept message may include the eDRX parameter.

Later, the UE and the network follow the ISR deactivation operation. At this time, the UE may set TIN as "GUTI".

Meanwhile, additionally, the UE may locally deactivate the eDRX.

More particularly, the UE may identify whether the network to which the UE itself is attached supports the eDRX mode through hyper frame information (e.g., information of HFN or H-SFN) of the SIB information provided from a BS (eNodeB or NodeB) in which the UE is currently camping. Accordingly, in the case that the BS (eNodeB or NodeB) on which the UE is currently camping does not support the eDRX and the UE wakes up on specific frame timing in an eDRX cycle and identifies it, the UE deactivates the eDRX locally. That is, the UE releases the eDRX mode operation.

At this time, the UE may perform the TAU or RAU procedure that does not include the eDRX parameter.

Meanwhile, in FIG. 19, it is illustrated the case that the MME supports the eDRX, the SGSN does not support the eDRX, and the UE is camping on E-UTRAN, but it may be identically applied to the case that the SGSN supports the eDRX, the MME does not support the eDRX, and the UE is camping on UTRAN, on the contrary. That is, in FIG. 19, in the case that the MME is substituted by the SGSN and the SGSN is substituted by the MME, a method for ISR control may be performed as below.

In the case that a UE wants to operate in the eDRX, the UE transmits a RAU Request message to the SGSN (step, S1901).

At this time, the RAU Request message includes the eDRX parameter for the eDRX mode.

The SGSN may identify an eDRX request according to whether there is the eDRX parameter requested by the UE from the received RAU Request message.

In addition, the SGSN exchanges whether to support the eDRX (eDRX capable) with the old network node (MME in FIG. 19) through S3 interface message (e.g., the existing defined control message (Context Request/Context Response message) or new control message).

The SGSN transmits the eDRX capability supported indication with being included in the Context Request message (or new control message) to the MME (step, S1902).

That is, when the SGSN supports the eDRX capability, the eDRX capability supported indication may be set to 1, and when the SGSN does not support the eDRX capability, the eDRX capability supported indication may be set to 0.

The MME transmits the eDRX capability supported indication with being included in the Context Response message (or new control message) to the MME (step, S1903).

That is, when the MME supports the eDRX capability, the eDRX capability supported indication may be set to 1, and when the MME does not support the eDRX capability, the eDRX capability supported indication may be set to 0.

In the case that either one of the networks (i.e., MME or SGSN) is unable to support the eDRX (i.e., the eDRX capability supported indication is set to '0'), the SGSN transmits a Context Acknowledge message (or new control message) with an indication that the ISR is deactivated (ISR not activated indication/information) to the MME (step, S1904).

Here, in the case that an indication that the ISR is activated (ISR Activated indication) of the UE is not included in the Context Acknowledge message, the UE may identify that it is the ISR not activated indication.

By performing this, both of the MME and the SGSN are deactivated.

In the case that either one of the networks is unable to support the eDRX (i.e., the eDRX capability supported indication is set to '0'), the SGSN transmits a RAU Accept message with an indication that the ISR is deactivated (ISR not activated indication/information) to the UE (step, S1905).

At this time, the RAU Accept message may include the eDRX parameter.

Later, the UE and the network follow the ISR deactivation operation. At this time, the UE may set TIN as "P-TMSI".

Meanwhile, additionally, the UE may locally deactivate the eDRX.

More particularly, the UE may identify whether the network to which the UE itself is attached supports the eDRX mode through hyper frame information (e.g., information of HFN or H-SFN) of the SIB information provided from a BS (eNodeB or NodeB) in which the UE is currently camping. Accordingly, in the case that the BS (eNodeB or NodeB) on which the UE is currently camping does not support the eDRX and the UE wakes up on specific frame timing in an eDRX cycle and identifies it, the UE deactivates the eDRX locally. That is, the UE releases the eDRX mode operation.

At this time, the UE may perform the TAU or RAU procedure that does not include the eDRX parameter.

B-4) According to another embodiment of the present invention, in the case that it operates in the eDRX mode in a situation in which the ISR is activated, a UE may locally deactivate the eDRX and/or the ISR.

The UE may identify whether the network to which the UE itself is attached supports the eDRX mode through hyper frame information (e.g., information of HFN or H-SFN) of the SIB information provided from a BS (eNodeB or NodeB) in which the UE is currently camping. Accordingly, in the case that the BS (eNodeB or NodeB) on which the UE is currently camping does not support the eDRX and the UE wakes up on specific frame timing in an eDRX cycle and identifies it, the UE deactivates the eDRX locally. That is, the UE releases the eDRX mode operation.

At this time, the UE may locally deactivate the ISR. That is, the UE may set TIN as "P-TMSI" (in the case that the UE is camping on UTRAN) or "GUTI" (in the case that the UE is camping on E-UTRAN).

In addition, at this time, the UE may perform the TAU or RAU procedure that does not include the eDRX parameter.

In the description of the present invention above, the operation of the UE that deactivates the ISR locally means that the UE performs the TAU request and the RAU request (unconditionally) when the UE moves between TA area and RA area.

The proposed method according to embodiment B-1), the proposed method according to embodiment B-2) and the proposed method according to embodiment B-3) may be independently applied with each other, but one or more proposed methods may be combined and applied.

In addition, since embodiments A-1), A-2) and A-3) relate to the method for determining ISR activation/deactivation when initially configuring activation/deactivation of the ISR, and embodiments B-1), B-2) and B-3) relate to the method for determining ISR activation/deactivation in the state that the ISR is activated, embodiments A-1), A-2) and A-3) and embodiments B-1), B-2) and B-3) may be combined and applied with each other.

FIG. 20 is a diagram illustrating a method for controlling paging according to an embodiment of the present invention.

In FIG. 20, it is assumed that the ISR is activated in a network (i.e., an MME, an SGSN and an S-GW), and a UE is in the eDRX mode currently. In addition, in such a situation, it is assumed the case that the UE attaches to TA or RA not belonged to TAI or RAI, and a part of networks (MME or SGSN) does not support the eDRX.

When the S-GW receives downlink data from a P-GW (step, S2001), the S-GW transmits a Downlink Data Notification (DDN) message to a first network node and a second network node (step, S2002).

Here, when the first network node the MME, the second network node may correspond to the SGSN, and when the first network node the SGSN, the second network node may correspond to the MME.

When the S-GW receives a DDN Reject message from either one of the first network node and the second network node in response to the DDN message, the S-GW transmits a Stop Paging Indication message to the remaining node (step, S2003). At this time, after a predetermined time from the timing of receiving the DDN Reject message (e.g., after a predetermined timer is driven and the timer expires), the Stop Paging Indication message may be transmitted to the remaining node.

In addition, the Stop Paging Indication message is a reject cause, and may include a Stop Paging Indication due to the eDRX support of the network node that transmits the DDN Reject message. In this case, the remaining network node that receives the Stop Paging Indication message may stop the paging transmission after a predetermined time from the timing of receiving the Stop Paging Indication message. For example, when the Stop Paging Indication message is received, a predetermined timer may be driven, and when the timer expires, the paging transmission may be stopped.

At this time, an example of the DDN Reject message may correspond to a DDN Acknowledge message including Unable to page UE due to the eDRX mode as a rejection cause, for example, or a new DDN Reject message.

In addition, the DDN Reject message may include downlink data storing duration information.

The S-GW that receives the DDN Reject message including downlink data storing duration information from the MME may store (buffering) the downlink data during the storing duration, and suspend (pending) a DDN transmission.

Later, when the S-GW receives information/indication indicating that the UE is not in the eDRX mode from the first network node or the second network node, the S-GW may start a DDN transmission to both of the first network node and the second network node.

Alternatively, when the S-GW receives information/indication indicating that the UE is not in the eDRX mode from the first network node or the second network node, the S-GW may start a transmission of the DDN message only to the node that transmits the information.

At this time, for example, the information may be transmitted through a Create Session Request message, a Modify Bearer Request message, a Modify Access Bearers Request message or a new message.

The first network node and/or the second network node that receive(s) the DDN from the S-GW may perform the paging transmission again, and when the UE receives paging, may perform Service Request procedure for paging response.

Finally, after the Service Request procedure, the S-GW may transmit a paging stop message to the first network node or the second network node. In addition, the S-GW transmits downlink data to the corresponding network (network to which the paging response is transmitted), and accordingly, the UE may receive the downlink data.

Overview of Devices to which the Present Invention can be Applied

FIG. 21 illustrates a block diagram of a communication device according to one embodiment of the present invention.

With reference to FIG. 21, a wireless communication system comprises a network node 2110 and a plurality of UEs 2120.

A network node 2110 comprises a processor 2111, memory 2112, and communication module 2113. The processor 2111 implements proposed functions, processes and/or methods proposed through FIG. 1 to FIG. 20. The processor 2111 can implement layers of wired/wireless interface protocol. The memory 2112, being connected to the processor 2111, stores various types of information for driving the processor 2111. The communication module 2113, being connected to the processor 2111, transmits and/or receives wired/wireless signals. Examples of the network node 2110 include an eNB, MME, HSS, SGW, PGW, application server and so on. In particular, in case the network node 2110 is an eNB, the communication module 2113 can include a Radio Frequency (RF) unit for transmitting/receiving a radio signal.

The UE 2120 comprises a processor 2121, memory 2122, and communication module (or RF unit) 2123. The processor 2121 implements proposed functions, processes and/or methods proposed through FIG. 1 to FIG. 20. The processor 2121 can implement layers of wired/wireless interface protocol. The memory 2122, being connected to the processor 2121, stores various types of information for driving the processor 2121. The communication module 2123, being connected to the processor 2121, transmits and/or receives wired/wireless signals.

The memory 2112, 2122 can be installed inside or outside the processor 2111, 2121 and can be connected to the processor 2111, 2121 through various well-known means. Also, the network node 2110 (in the case of an eNB) and/or the UE 1420 can have a single antenna or multiple antennas.

FIG. 22 illustrates a block diagram of a wireless communication apparatus according to an embodiment of the present invention.

Particularly, in FIG. 22, the UE described above FIG. 21 will be exemplified in more detail.

Referring to FIG. 22, the UE includes a processor (or digital signal processor) 2210, RF module (RF unit) 2235, power management module 2205, antenna 2240, battery 2255, display 2215, keypad 2220, memory 2230, Subscriber Identification Module (SIM) card 2225 (which may be optional), speaker 2245 and microphone 2250. The UE may include a single antenna or multiple antennas.

The processor 2210 may be configured to implement the functions, procedures and/or methods proposed by the present invention as described in FIG. 1-20. Layers of a wireless interface protocol may be implemented by the processor 2210.

The memory 2230 is connected to the processor 2210 and stores information related to operations of the processor 2210. The memory 2230 may be located inside or outside the processor 2210 and may be connected to the processors 2210 through various well-known means.

A user enters instructional information, such as a telephone number, for example, by pushing the buttons of a keypad 2220 or by voice activation using the microphone 2250. The microprocessor 2210 receives and processes the instructional information to perform the appropriate function, such as to dial the telephone number. Operational data may be retrieved from the SIM card 2225 or the memory module 2230 to perform the function. Furthermore, the processor 2210 may display the instructional and operational information on the display 2215 for the user's reference and convenience.

The RF module 2235 is connected to the processor 2210, transmits and/or receives an RF signal. The processor 2210 issues instructional information to the RF module 2235, to initiate communication, for example, transmits radio signals comprising voice communication data. The RF module 2235 comprises a receiver and a transmitter to receive and transmit radio signals. An antenna 2240 facilitates the transmission and reception of radio signals. Upon receiving radio signals, the RF module 2235 may forward and convert the signals to baseband frequency for processing by the processor 2210. The processed signals would be transformed into audible or readable information outputted via the speaker 2245.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention may be achieved by various means, for example, hardware, firmware, software, or a combination thereof. In a hardware configuration, the methods according to the embodiments of the present invention may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the embodiments of the present invention may be implemented in the form of a module, a procedure, a function, etc. Software code may be stored in a memory unit and executed by a processor. The memory unit may be located at the interior or exterior of the processor and may transmit data to and receive data from the processor via various known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The present invention is applied to a 3GPP LTE/LTE-A system is primarily described, but can be applied to various wireless communication systems in addition to the 3GPP LTE/LTE-A system.

The invention claimed is:

1. A method for controlling paging of a user equipment (UE) in which Idle-mode Signaling Reduction (ISR) is activated performed by a Serving Gateway (S-GW) in a wireless communication system, the method comprising:
    transmitting a Downlink Data Notification (DDN) message to both of a first network node and a second network node, when receiving downlink data from a Packet Data Network Gateway (P-GW); and
    when receiving a DDN Reject message from either one network node of the first network node and the second network node in response to the DDN message, transmitting a Stop Paging Indication message to a remaining network node,
    wherein the Stop Paging Indication message includes a Stop Paging Indication due to an Extended Idle mode Discontinuous Reception (eDRX) support of the network node that transmits the DDN Reject message as a reject cause.

2. The method of claim 1, wherein the DDN Reject message includes Unable to transmit paging due to an eDRX mode of the UE as a rejection cause.

3. The method of claim 2, wherein the DDN Reject message includes storing duration information of the downlink data.

4. The method of claim 3, further comprising storing the downlink data during the storing duration.

5. The method of claim 4, further comprising pending a transmission of the DDN message during the storing duration.

6. The method of claim 5, further comprising, when receiving information indicating that the UE is not in the eDRX mode from the first network node or the second network node, transmitting the DDN message to the first network node and the second network node.

7. The method of claim 5, further comprising, when receiving information indicating that the UE is not in the eDRX mode from the first network node or the second network node, transmitting the DDN message only to the network node that transmits the information.

8. The method of claim 1, wherein transmitting the Stop Paging Indication message is performed by:
    driving a timer from a timing of receiving the DDN Reject message, and transmitting the Stop Paging Indication message after the timer expires.

9. A method for controlling paging of a user equipment (UE) in which Idle-mode Signaling Reduction (ISR) is activated performed by a network node in a wireless communication system, the method comprising:
    receiving a Downlink Data Notification (DDN) message from a Serving Gateway (S-GW);
    transmitting paging to the UE according to the DDN message;
    driving a timer, when receiving a Stop Paging Indication message due to support an Extended Idle mode Discontinuous Reception (eDRX) mode of another network node as a rejection cause; and
    stopping the paging transmission after the timer expires.

* * * * *